US009986163B2

(12) United States Patent
Park et al.

(10) Patent No.: US 9,986,163 B2
(45) Date of Patent: May 29, 2018

(54) DIGITAL PHOTOGRAPHING APPARATUS AND DIGITAL PHOTOGRAPHING METHOD

(71) Applicant: SAMSUNG ELECTRONICS CO., LTD., Suwon-si, Gyeonggi-do (KR)

(72) Inventors: Jae-hyoung Park, Yongin-si (KR); Woo-seok Choi, Suwon-si (KR)

(73) Assignee: SAMSUNG ELECTRONICS CO., LTD., Suwon-si, Gyeonggi-do (KR)

( * ) Notice: Subject to any disclaimer, the term of this patent is extended or adjusted under 35 U.S.C. 154(b) by 23 days.

(21) Appl. No.: 15/001,415

(22) Filed: Jan. 20, 2016

(65) Prior Publication Data

US 2017/0026558 A1 Jan. 26, 2017

(30) Foreign Application Priority Data

Jul. 23, 2015 (KR) .................. 10-2015-0104360

(51) Int. Cl.
*H04N 5/232* (2006.01)
*H04N 5/345* (2011.01)
*H04N 5/355* (2011.01)

(52) U.S. Cl.
CPC ....... *H04N 5/2327* (2013.01); *H04N 5/23212* (2013.01); *H04N 5/23241* (2013.01); *H04N 5/23254* (2013.01); *H04N 5/23293* (2013.01); *H04N 5/3456* (2013.01); *H04N 5/35554* (2013.01)

(58) Field of Classification Search
CPC ............. H04N 5/2327; H04N 5/23241; H04N 5/23293; H04N 5/35563
See application file for complete search history.

(56) References Cited

U.S. PATENT DOCUMENTS

| 2005/0219642 | A1* | 10/2005 | Yachida | ................. | H04N 5/335 |
| | | | | | 358/448 |
| 2005/0237422 | A1* | 10/2005 | Kido | .................... | H04N 3/1537 |
| | | | | | 348/362 |
| 2006/0177103 | A1* | 8/2006 | Hildreth | ................. | G06T 7/269 |
| | | | | | 382/107 |
| 2007/0127574 | A1* | 6/2007 | Yao | .......................... | G06T 5/50 |
| | | | | | 375/240.16 |

(Continued)

FOREIGN PATENT DOCUMENTS

| JP | 2006-74693 | 3/2006 |
| KR | 10-2015-0078275 | 7/2015 |

OTHER PUBLICATIONS

Search Report and Written Opinion dated Jul. 5, 2016 in counterpart International Patent Application No. PCT/KR2016/003229.

*Primary Examiner* — Abdelaaziz Tissire
(74) *Attorney, Agent, or Firm* — Nixon & Vanderhye, P.C.

(57) ABSTRACT

A digital photographing apparatus includes: an image sensor including a first pixel group and a second pixel group each pixel group including a plurality of pixels for generating an imaging signal by photoelectrically converting incident light, the image sensor being configured to acquire the imaging signal two or more times in the second pixel group and to acquire the imaging signal once in the first pixel group; and a processor configured to acquire an image in which a motion of a subject appears based on the imaging signal acquired by the image sensor, and to generate a motion-corrected image based on the imaging signal acquired in the second pixel group.

19 Claims, 18 Drawing Sheets

(56) References Cited

U.S. PATENT DOCUMENTS

| | | | | |
|---|---|---|---|---|
| 2008/0219585 A1* | 9/2008 | Kasai | ............... | H04N 5/2351 382/274 |
| 2008/0291285 A1* | 11/2008 | Shimizu | ............... | H04N 5/144 348/208.6 |
| 2009/0316033 A1* | 12/2009 | Uchida | ............... | H04N 5/23232 348/308 |
| 2010/0053346 A1* | 3/2010 | Mitsunaga | ............... | H04N 5/23248 348/208.6 |
| 2010/0091119 A1* | 4/2010 | Lee | ............... | H04N 5/23248 348/208.4 |
| 2010/0123807 A1* | 5/2010 | Lee | ............... | G06T 5/50 348/241 |
| 2010/0201862 A1* | 8/2010 | Hatabu | ............... | H04N 5/3535 348/311 |
| 2011/0069200 A1* | 3/2011 | Oh | ............... | H04N 5/235 348/229.1 |
| 2011/0069205 A1* | 3/2011 | Kasai | ............... | G06T 7/254 348/239 |
| 2012/0162449 A1 | 6/2012 | Braun et al. | | |
| 2012/0162450 A1* | 6/2012 | Park | ............... | H04N 5/145 348/208.4 |
| 2012/0162454 A1* | 6/2012 | Park | ............... | H04N 5/145 348/208.6 |
| 2013/0051700 A1* | 2/2013 | Jo | ............... | H04N 5/23254 382/284 |
| 2013/0088610 A1* | 4/2013 | Lee | ............... | H04N 5/23254 348/208.99 |
| 2013/0135506 A1* | 5/2013 | Kobayashi | ............... | H04N 5/35554 348/311 |
| 2013/0258149 A1* | 10/2013 | Choi | ............... | H04N 5/23212 348/294 |
| 2014/0111675 A1* | 4/2014 | Tatsuzawa | ............... | H04N 5/341 348/302 |
| 2014/0198226 A1* | 7/2014 | Lee | ............... | H04N 5/2355 348/208.1 |
| 2014/0232929 A1* | 8/2014 | Ichikawa | ............... | H04N 5/2355 348/362 |
| 2015/0097999 A1* | 4/2015 | Sambonsugi | ............... | H04N 5/23245 348/322 |
| 2015/0189142 A1 | 7/2015 | Kang | | |
| 2016/0044258 A1* | 2/2016 | Kim | ............... | H04N 5/3535 348/296 |
| 2016/0316132 A1* | 10/2016 | Kinoshita | ............... | H04N 5/345 |

* cited by examiner

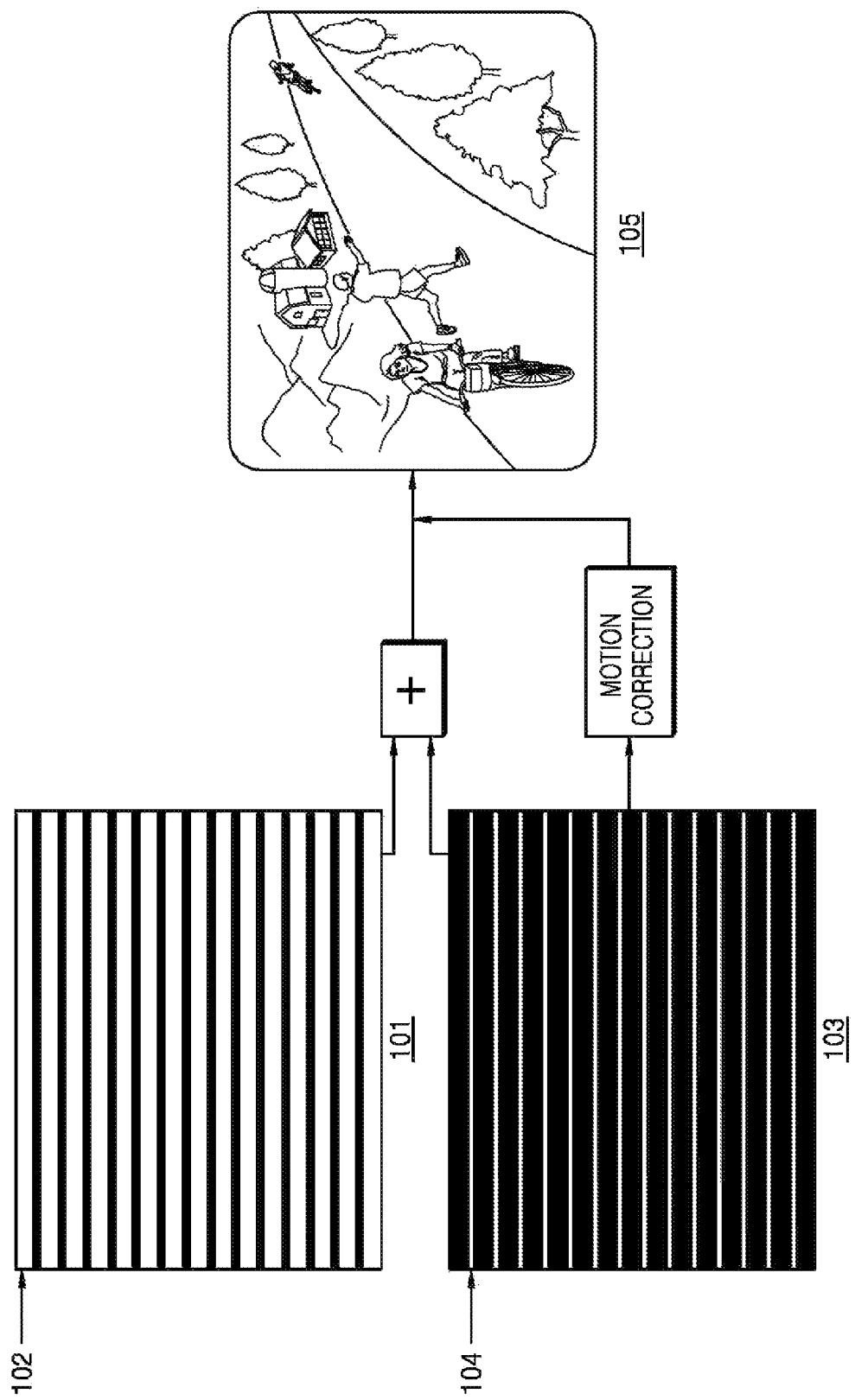

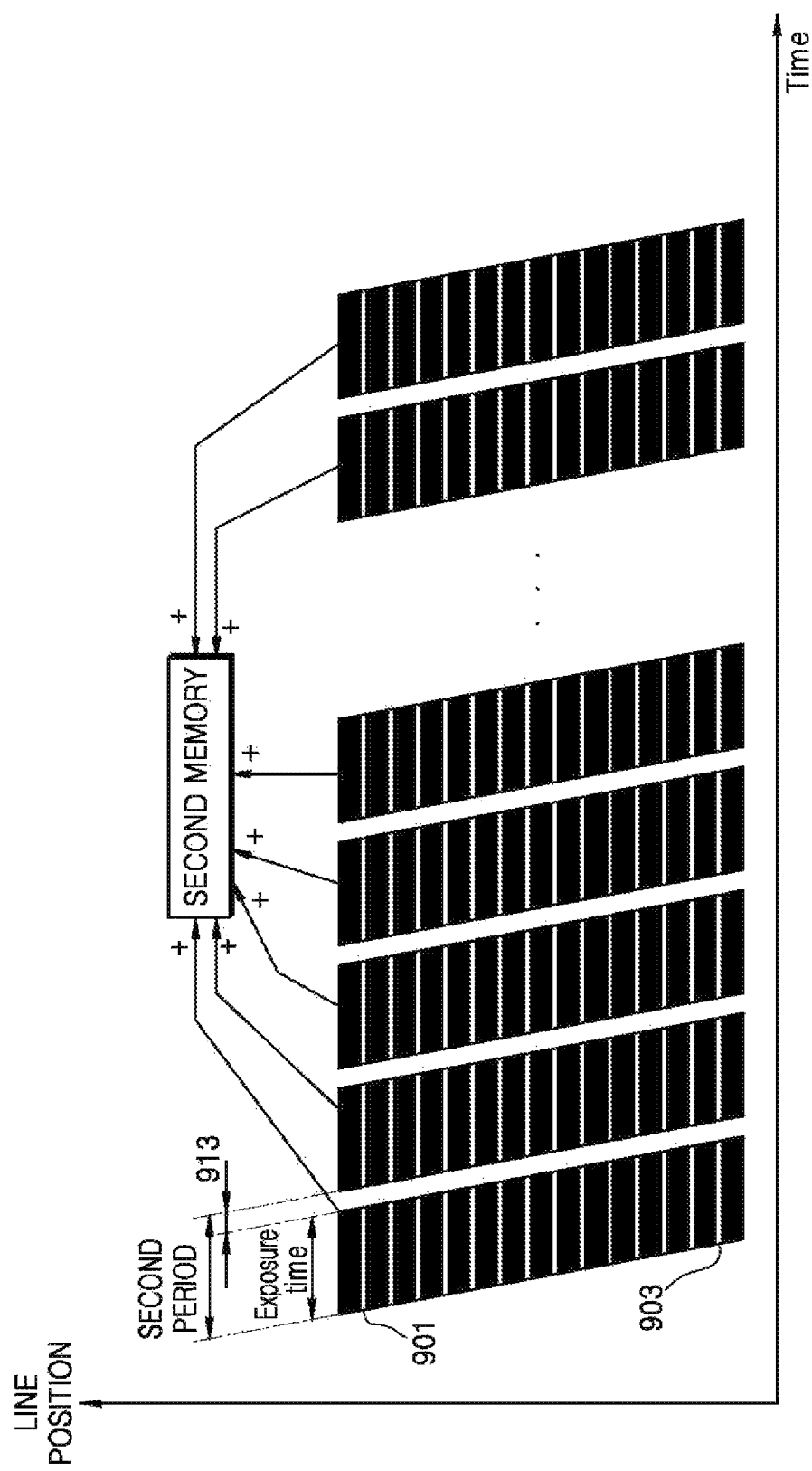

DIGITAL PHOTOGRAPHING APPARATUS AND DIGITAL PHOTOGRAPHING METHOD

CROSS-REFERENCE TO RELATED APPLICATION

This application is based on and claims priority under 35 U.S.C. § 119 to Korean Patent Application No. 10-2015-0104360, filed on Jul. 23, 2015, in the Korean Intellectual Property Office, the disclosure of which is incorporated by reference herein in its entirety.

BACKGROUND

1. Field

The disclosure relates to digital photographing apparatuses and digital photographing methods, and for example, to digital photographing apparatuses and digital photographing methods capable of correcting motion blur.

2. Description of Related Art

Various methods have been used for correcting motion blur of an image captured by a digital photographing apparatus, such as a smartphone, a tablet computer, a digital camera, or a digital camcorder.

Two types of blur may be included in a still image captured by the digital photographing apparatus. One is motion blur caused by a motion of a subject, and the other is hand blur caused by shaking of a user of a digital photographing apparatus. The motion blur may appear as a local motion of an image, and the hand blur may appear as a global motion of an image.

Motion blur of an image captured by the digital photographing apparatus may be corrected by shifting the image in a direction opposite to the motion. Alternatively, the image may be corrected by using electrical signals acquired by the digital photographing apparatus.

SUMMARY

Digital photographing apparatuses and digital photographing methods capable of reducing power consumption for acquiring a motion-corrected image and acquiring an image with reduced and/or no shake effects even in nightscape and low luminance environments are provided.

Digital photographing apparatuses and digital photographing methods capable of acquiring a more accurately motion-corrected image are provided.

Additional aspects will be set forth in part in the description which follows and, in part, will be apparent from the description.

According to an aspect of an example embodiment, a digital photographing apparatus includes: an image sensor including a first pixel group and a second pixel group each pixel group including a plurality of pixels for generating an imaging signal by photoelectrically converting incident light, the image sensor being configured to acquire the imaging signal two or more times in the second pixel group while acquiring the imaging signal once in the first pixel group; and a processor configured to acquire an image in which a motion of a subject appears based on the imaging signal acquired by the image sensor, and to generate a motion-corrected image based on the imaging signal acquired in the second pixel group.

The processor may be configured to acquire the image in which a motion of a subject appears based on a sum of values of the imaging signal acquired in the first pixel group and the imaging signal acquired in the second pixel group.

The number of pixels included in the first pixel group may be greater than the number of pixels included in the second pixel group.

The image sensor may be configured to acquire the imaging signal in the first pixel group during a first period and to acquire the imaging signal in the second pixel group during a second period, wherein the first period may be a multiple of the second period.

The processor may be configured to acquire intermediate images during the second period based on the imaging signal acquired in the second pixel group and to acquire motion vectors during the second period based on the acquired intermediate images.

The processor may be configured to generate the motion-corrected image based on the acquired motion vectors and shake information of the digital photographing apparatus.

The digital photographing apparatus may further include a display configured to display the motion-corrected image.

The display may be configured to display a live view image based on the intermediate images that are acquired based on the imaging signal acquired in the second pixel group before displaying the motion-corrected image.

The processor may be configured to perform a wide dynamic range (WDR) function by adjusting at least one of: the first period, the second period, and an exposure time during the second period.

The image sensor may include pixels capable of acquiring distance information, and the processor may be configured to acquire distance information and autofocus (AF) information using a phase difference signal acquired by the pixels.

According to an aspect of another example embodiment, a digital photographing method is provided using an image sensor including a first pixel group and a second pixel group each pixel group including a plurality of pixels for generating an imaging signal by photoelectrically converting incident light, the digital photographing method including: acquiring an imaging signal two or more times in the second pixel group while acquiring the imaging signal once in the first pixel group; acquiring an image in which a motion of a subject appears, based on the imaging signal acquired by the image sensor; and generating a motion-corrected image based on the imaging signal acquired in the second pixel group.

The acquiring of the image may include acquiring the image based on a sum of values of the imaging signal acquired in the first pixel group and the imaging signal acquired in the second pixel group.

The number of pixels included in the first pixel group may be greater than the number of pixels included in the second pixel group.

The acquiring of the imaging signal may include: acquiring the imaging signal in the first pixel group during a first period; and acquiring the imaging signal in the second pixel group during a second period, wherein the first period is a multiple of the second period.

The generating of the motion-corrected image may include: acquiring intermediate images during the second period based on the imaging signal acquired in the second pixel group; and acquiring motion vectors during the second period based on the acquired intermediate images.

The generating of the motion-corrected image may further include acquiring the motion-corrected image based on the acquired motion vectors and shake information of a digital photographing apparatus.

The digital photographing method may further include displaying the motion-corrected image.

The digital photographing method may further include displaying a live view image based on the intermediate images that are acquired based on the imaging signal acquired in the second pixel group before displaying the motion corrected image.

The digital photographing method may further include performing a wide dynamic range (WDR) function by adjusting at least one of: the first period, the second period, and an exposure time during the second period.

A motion vector having a direction perpendicular to a light-receiving surface and autofocus (AF) information may be acquired using a distance information signal acquired by pixels of the image sensor capable, the pixels of the image sensor being capable of acquiring distance information.

According to an aspect of another example embodiment, an image sensor includes: a first pixel group and a second pixel group each pixel group including a plurality of pixels for generating an imaging signal by photoelectrically converting incident light, wherein the image sensor is configured to acquire the imaging signal two or more times in the second pixel group while acquiring the imaging signal once in the first pixel group.

The number of pixels included in the first pixel group may be larger than the number of pixels included in the second pixel group.

The image sensor may be configured to acquire the imaging signal in the first pixel group during a first period and to acquire the imaging signal in the second pixel group during a second period, wherein the first period may be a multiple of the second period.

BRIEF DESCRIPTION OF THE DRAWINGS

These and/or other aspects will become apparent and more readily appreciated from the following detailed description, taken in conjunction with the accompanying drawings, in which like reference numerals refer to like elements, and wherein:

FIG. 1 is a diagram illustrating an example operation of a digital photographing apparatus;

FIGS. 9A to 9C are diagrams illustrating an example process by which the digital photographing apparatus acquires an imaging signal in second lines;

DETAILED DESCRIPTION

Figure 2A:
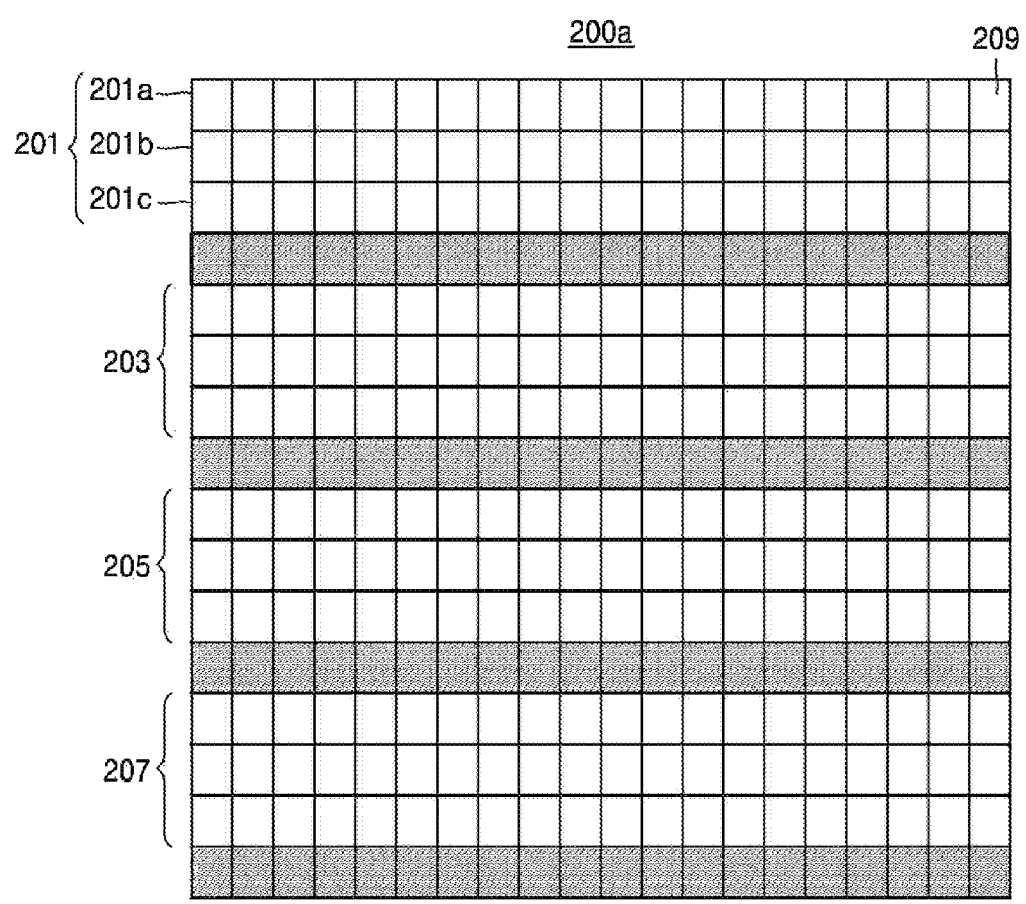
FIG. 2A is a diagram illustrating an example first pixel group of an image sensor.

The terms used in the disclosure will be described briefly and example embodiments will then be described in greater detail.

The terms used in the disclosure are those general terms currently widely used in the art in consideration of functions in regard to the disclosure, but the terms may vary according to the intention of those of ordinary skill in the art, precedents, or new technology in the art. Specified terms may be arbitrarily selected, and in this case, the detailed meaning thereof will be described in the detailed description. Thus, the terms used in the disclosure should be understood not as simple names but based on the meaning of the terms and the overall description in the disclosure.

It will also be understood that the terms "comprises", "includes", and "has", when used herein, specify the presence of stated elements, but do not preclude the presence or addition of other elements, unless otherwise defined. Also, the terms "unit" and "module" used herein may refer to a unit for processing at least one function or operation, which may be implemented by hardware (e.g., circuitry), software, or a combination of hardware and software.

The example embodiments will be described with reference to the accompanying drawings in such a manner that the example embodiments may be easily understood by a person of ordinary skill in the art. However, the disclosure may be implemented in various forms and is not limited to the example embodiments. In addition, descriptions of well-known functions and constructions may be omitted for clarity and conciseness, and similar reference numerals are assigned to similar elements throughout the disclosure. Expressions such as "at least one of," when preceding a list of elements, modify the entire list of elements and do not necessarily modify the individual elements of the list.

Hereinafter, example embodiments will be described with reference to the accompanying drawings.

FIG. 1 is a diagram illustrating an example operation of a digital photographing apparatus.

The digital photographing apparatus according to the example embodiment may include an image sensor.

The image sensor may generate an electrical imaging signal by photoelectrically converting incident light. The image sensor may, for example, be a charge-coupled device (CCD) image sensor or a complementary metal-oxide semiconductor image sensor (CIS), or the like, configured to convert an optical signal into an electrical signal. The image sensor may include a plurality of pixels configured to convert an optical signal into an electrical signal, and the plurality of pixels may, for example, be arranged in a matrix form.

The image sensor may include, for example, a first pixel group and a second pixel group.

The first pixel group may include, for example, a pixel row where an imaging signal is acquired once while the digital photographing apparatus captures one sheet of a still image.

The second pixel group may include, for example, a pixel row where imaging signals are acquired two or more times while the digital photographing apparatus captures one sheet of a still image. For example, while capturing one sheet of a still image, the digital photographing apparatus may separately acquire imaging signals two or more times in the second pixel group.

The arrangement of the pixels included in the first pixel group and the second pixel group may not be limited to a specific form. For example, the pixels included in one pixel group may not be disposed adjacent to one another and may be scattered in the image sensor.

For convenience, it is assumed that the first pixel group is arranged in the form of first lines 102 and the second pixel group is arranged in the form of second lines 104. The first lines 102 and the second lines 104 may include at least one pixel row including a plurality of pixels.

In an upper diagram 101 of FIG. 1, regions in which the first lines 102 are arranged in the entire image sensor are indicated with a bright color. In a lower diagram 103 of FIG. 1, regions in which the second lines 104 are arranged in the entire image sensor are indicated with a bright color.

Referring to FIG. 1, an area of the regions in which the first lines 102 are arranged may be wider than an area of the regions in which the second lines 104 are arranged. In addition, the regions including the first lines 102 and the regions including the second lines 104 may, for example, be alternately arranged.

Referring to FIG. 1, the digital photographing apparatus may acquire a result image 105 based on an imaging signal acquired from the regions where the first lines 102 are arranged and imaging signals acquired two or more times from the regions in which the second lines 104 are arranged.

A motion of a subject may occur when the digital photographing apparatus photographs the subject and acquires the result image 105. Referring to FIG. 1, the digital photographing apparatus may correct the motion appearing in the result image 105 based on the imaging signal acquired from the regions in which the second lines 104 are arranged.

For example, the digital photographing apparatus may acquire a plurality of intermediate images based on imaging signals acquired from the regions in which the second lines 104 are arranged. The digital photographing apparatus may determine a trajectory of the motion appearing in the result image 105 based on the plurality of intermediate images. The digital photographing apparatus may correct the motion appearing in the result image 105 based on the determined motion trajectory.

It may take 0.1 seconds or more for the digital photographing apparatus to acquire the imaging signal once in the entire regions of the image sensor.

In a case where the digital photographing apparatus uses a method of correcting a motion using imaging signals acquired two or more times in the entire regions of the image sensor, it may take at least 0.2 seconds for the imaging signals to be acquired two or more times in the entire region of the image sensor.

While acquiring one sheet of a still image, the digital photographing apparatus described with reference to FIG. 1 may acquire the imaging signal once in some regions of the image sensor and acquire the imaging signals two or more times in some other regions. In addition, the digital photographing apparatus may correct the motion from the imaging signals acquired two or more times. Accordingly, the time necessary for acquiring the image may be reduced as compared to a case where the digital photographing apparatus uses the imaging signals acquired in the entire regions of the image sensor to correct the motion.

FIG. 2A is a diagram illustrating an example first pixel group of an image sensor 200a.

The image sensor 200a according to the example embodiment may include a plurality of pixels 209 arranged in a matrix form.

The image sensor 200a may include, for example, a first pixel group. The arrangement of the pixels included in the first pixel group may not be limited to a specific form. For example, the pixels included in the first pixel group may not be disposed adjacent to one another and may be scattered in the image sensor 200a.

For convenience, it is assumed that the first pixel group is arranged, for example, in the form of first lines 201, 203, 205, and 207.

Referring to FIG. 2A, the first lines 201, 203, 205, and 207 may include, for example, at least one pixel row including a plurality of pixels.

The image sensor 200a may acquire an imaging signal once at the first lines 201, 203, 205, and 207 while the digital photographing apparatus captures one sheet of a still image.

Figure 2B:
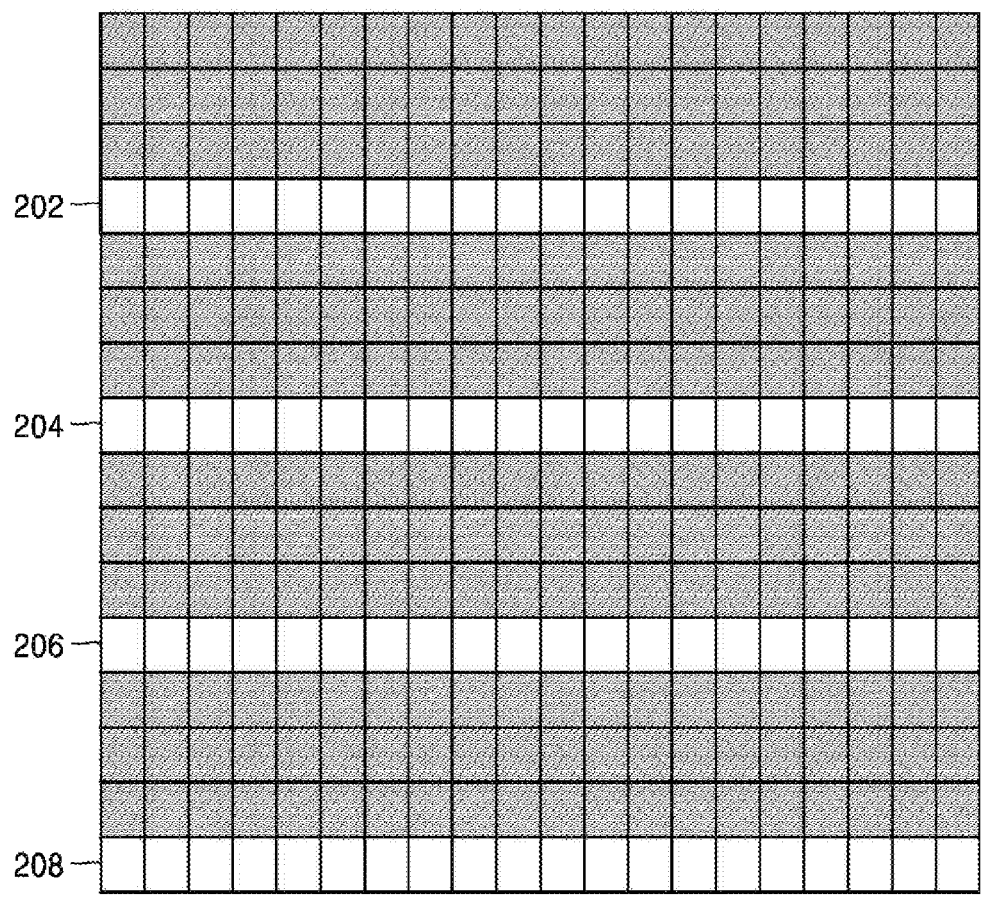
FIG. 2B is a diagram illustrating an example second pixel group of an image sensor.

The first line 201 may include, for example, pixel rows 201a, 201b, and 201c. Although each of the first lines 201, 203, 205, and 207 is illustrated in FIG. 2A as including three pixel rows, example embodiments are not limited thereto. In addition, although a 20×16 image sensor 200a is illustrated in FIG. 2A, example embodiments are not limited thereto. The number and the arrangement of the pixels of the image sensor 200a may be changed. The first lines may include, for example, pixels capable of acquiring distance information. FIG. 2B is a diagram illustrating an example second pixel group of an image sensor 200b.

The image sensor 200b according to an example embodiment may include a plurality of pixels arranged in a matrix form.

The image sensor 200b may include a second pixel group. The arrangements of the pixels included in the second pixel group are not limited to a specific form. For example, the pixels included in the second pixel group may not be disposed adjacent to one another and may be scattered in the image sensor 200b.

Hereinafter, for convenience, it is assumed that the second pixel group is arranged, for example, in the form of second lines 202, 204, 206, and 208.

Referring to FIG. 2B, the second lines 202, 204, 206, and 208 may include, for example, at least one pixel row including a plurality of pixels.

While the digital photographing apparatus captures one sheet of a still image, the image sensor 200b may acquire imaging signals two or more times at the second lines 202, 204, 206, and 208.

Each of the second lines 202, 204, 206, and 208 may include, for example, a pixel row. Although each of the second lines 202, 204, 206, and 208 is illustrated in FIG. 2B as including one pixel row, example embodiments are not limited thereto. In addition, although a 20×16 image sensor 200b is illustrated in FIG. 2B, example embodiments are not limited thereto. The number and the arrangement of the pixels of the image sensor 200b may be changed. The second lines may include pixels capable of acquiring distance information.

Figure 3:
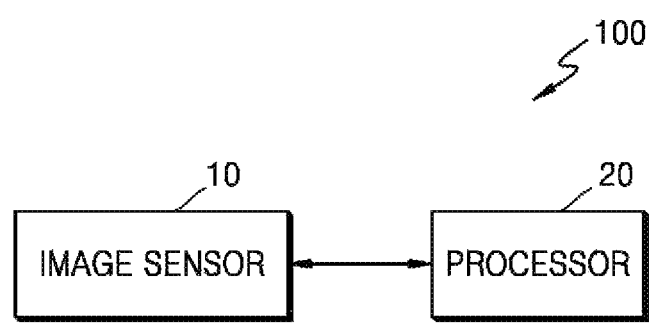
FIG. 3 is a block diagram illustrating an example digital photographing apparatus.

FIG. 3 is a block diagram illustrating an example digital photographing apparatus 100.

The digital photographing apparatus 100 according to the example embodiment may include, for example, an image sensor 10 and a processor 20.

The image sensor 10 may, for example, generate an electrical imaging signal by photoelectrically converting incident light. The image sensor 10 may include, for example, a plurality of pixels configured to convert an optical signal into an electrical signal, and the plurality of pixels may be arranged in a matrix form.

The image sensor 10 may include a first pixel group (see 102 of FIG. 1) and a second pixel group (see 104 of FIG. 1). Each of the first pixel group and the second pixel group may include, for example, at least one pixel row including a plurality of pixels.

The image sensor 10 may acquire imaging signals two or more times in the second pixel group while acquiring an imaging signal once in the first pixel group.

For example, while the digital photographing apparatus 100 captures one sheet of a still image, the image sensor 10 may acquire an imaging signal once in the first pixel group. In addition, while the digital photographing apparatus 100 captures one sheet of a still image, the image sensor 10 may acquire imaging signals two or more times in the second pixel group. For example, while the digital photographing apparatus 100 captures one sheet of a still image, the image sensor 10 may separately acquire imaging signals two or more times in the second pixel group.

The image sensor 10 may acquire imaging signals in the first pixel group during a first period and acquire imaging signals in the second pixel group during a second period. The first period may, for example, be a multiple of the second period.

In the image sensor 10 according to the example embodiment, the number of the pixels included in the first pixel group may, for example, be greater than the number of the pixels included in the second pixel group.

The processor 20 according to the example embodiment may be configured to acquire an image in which a motion of a subject appears, based on the imaging signal captured in the first pixel group and the imaging signals acquired two or more times in the second pixel group. For example, the processor 20 may acquire an image based on the sum of a value of the imaging signal captured in the first pixel group and values of the imaging signals acquired in the second pixel group.

In addition, the processor 20 may be configured to generate a motion-corrected image based on the imaging signals acquired in the second pixel group.

For example, the processor 20 may be configured to acquire intermediate images during the second period, based on the imaging signals acquired in the second pixel group. The processor 20 may be configured to acquire a motion vector based on the intermediate images acquired during the second period. The processor 20 may be configured to determine a motion trajectory based on the acquired motion vector. In addition, the processor 20 may be configured to generate a motion-corrected image based on the acquired motion vector and shake information of the digital photographing apparatus 100.

While acquiring one sheet of a still image, the digital photographing apparatus 100 may acquire the imaging signal once in some regions of the image sensor 10 and acquire the imaging signals two or more times in some other regions of the image sensor 10. The digital photographing apparatus 100 may correct the motion using the imaging signals acquired two or more times. Accordingly, the time necessary for acquiring the image may be reduced as compared to a case where the digital photographing apparatus 100 uses the imaging signals acquired in the entire regions of the image sensor 10 to correct the motion.

The digital photographing apparatus 100 according to the example embodiment is capable of reducing power consumption for acquiring the motion-corrected image and may, for example, acquire an image with reduced and/or without any shake effects even in nightscape and low luminance environments.

According to the example embodiment, the processor 20 may be configured to adjust a ratio of the number of the pixel rows included in the first pixel group to the number of the pixel rows included in the second pixel group. The processor 20 may be configured to adjust an amount of the imaging signals acquired in the second pixel group.

According to the example embodiment, the processor 20 may be configured to adjust a total exposure time of the first pixel group and a total exposure time of the second line. The processor 20 may be configured to perform a wide dynamic range (WDR) by setting the total exposure time of the first pixel group and the total exposure time of the second line to be different from each other. The WDR is a technique for naturally displaying a portion having a great luminance difference in a single image.

For example, the processor 20 may be configured to use a high dynamic range (HDR) technique to generate a single image in which a portion having a great luminance difference is naturally displayed, based on an image with a long exposure time and an image with a short exposure time.

For example, when the total exposure time of the first pixel group is longer than the total exposure time of the second pixel group, the processor 20 may be configured to acquire an image of a portion having a low luminance using the imaging signal acquired in the first pixel group to perform a WDR process. In addition, the processor 20 may be configured to acquire an image of a portion having a high luminance using the imaging signal acquired in the second pixel group to perform a WDR process.

The digital photographing apparatus 100 according to the example embodiment is capable of reducing power consumption for the WDR process and acquire an image with reduced and/or without any shake effects.

In addition, the processor 20 may be configured to adjust the second period during which the imaging signals are acquired in the second pixel group. For example, the processor 20 may be configured to determine the second period based on characteristics of a lens of the digital photographing apparatus 100. For example, the processor 20 may be configured to adjust the second period in proportion to a reciprocal of a focal length of the lens. The processor 20 may, for example, be configured to determine the second period as follows: "second period=1/(focal length*2)"

For example, when the digital photographing apparatus 100 uses a lens having a focal length of 50 mm, the processor 20 may determine "1/50*1/2 second as the second period. For example, the processor 20 may determine 1/100 second as the second period. As another example, when the digital photographing apparatus 100 uses a lens having a focal length of 35 mm, the processor 20 may determine "1/35*1/2 second as the second period. For example, the processor 20 may determine 1/70 second as the second period.

The digital photographing apparatus 100 according to the example embodiment may acquire a more accurately motion-corrected image by adjusting a sampling period of the motion.

Figure 4:
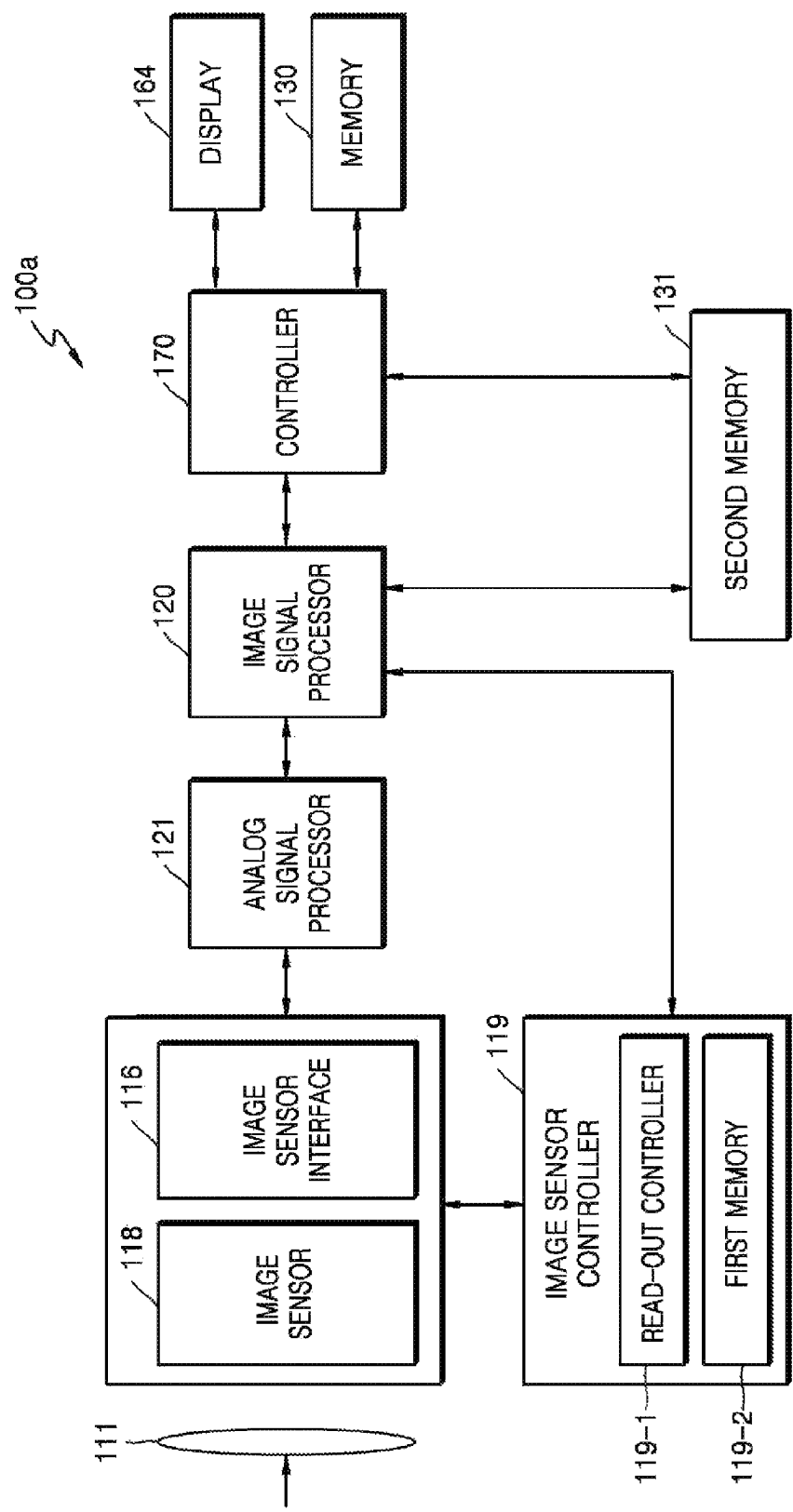
FIG. 4 is a block diagram illustrating an example digital photographing apparatus.

FIG. 4 is a block diagram illustrating an example digital photographing apparatus 100*a*.

The digital photographing apparatus 100*a* may include, for example, all or part of the elements of the digital photographing apparatus 100. The operations of the processor 20 of FIG. 3 may, for example, be performed by an image sensor controller 119 and/or a controller 170 of FIG. 4.

The digital photographing apparatus 100*a* according to the example embodiment may include a lens 111, an image sensor interface 116, an image sensor 118, the image sensor controller 119, an image signal processor 120, an analog signal processor 121, a memory 130, a second memory 131, a display 164, and the controller 170.

The lens 111 may include, for example, a plurality of lens groups, each of which includes a plurality of lenses. Subject light passing through the lens 111 may form a subject image on a light-receiving surface of the image sensor 118.

The image sensor 118 may, for example, be a charge-coupled device (CCD) image sensor or a complementary metal-oxide semiconductor image sensor (CIS), or the like, configured to convert an optical signal into an electrical signal. The image sensor 118 may include a plurality of pixels arranged, for example, in a matrix form. The plurality of pixels may include, for example, a pixel for a phase difference detection.

The image sensor 118 may include a first pixel group and a second pixel group. The first pixel group may include, for example, a pixel row where an imaging signal is acquired once while the digital photographing apparatus 100*a* captures one sheet of a still image. The second pixel group may include, for example, a pixel row where imaging signals are acquired two or more times while the digital photographing apparatus 100*a* captures one sheet of the still image.

The image sensor interface 116 may be configured to control the apparatus such that the imaging signal acquired by the image sensor 118 is processed by the image signal processor 120.

The image sensor controller 119 may include, for example, a read-out controller 119-1 and a first memory 119-2.

The read-out controller 119-1 may be configured to control the image sensor 118 to acquire the imaging signals from the first pixel group and the second pixel group. The image sensor 118 acquires a value of an electrical signal corresponding to charges accumulated in the pixel it may be said that the pixel is read out.

In addition, the read-out controller 119-1 may be configured to control the image sensor 118 to skip some of the pixels and read out some of the other pixels.

The read-out controller 119-1 may be configured to selectively read out the first pixel group and the second pixel group from the image sensor 118. The read-out controller 119-1 may be configured to read out the first pixel group during a first period and read out the second pixel group during a second period.

The first memory 119-2 may, for example, store information about the arrangement of the first pixel group and the second pixel group in the image sensor 118. The first memory 119-2 may, for example, store information about the first period and the second period and information about the exposure time at each of the first period and the second period. In the case of skipping some of the pixels and reading out some of the other pixels, the first memory 119-2 may store information about the skipped pixels and the read-out pixels.

In addition, the first memory 119-2 may, for example, store a value of an imaging signal acquired in the second pixel group while one sheet of an image is captured.

The analog signal processor 121 may be configured to perform noise reduction, gain control, waveform shaping, and analog-to-digital conversion, etc. on an analog signal provided from the image sensor 118.

The image signal processor 120 may be configured to perform a specific function on an image data signal processed by the analog signal processor 121. The image signal processor 120 may be configured to compress input image data into an image file, or may reconstruct image data from the image file.

The image signal processor 120 may be configured to acquire distance information and autofocus (AF)-related information by processing a signal capable of acquiring the distance information. The controller 170 may be configured to process an input image signal and to control the components of the digital photographing apparatus 100 based on the processed image signal or an external input signal. The controller 170 may, for example, include one or more processors.

The controller 170 may be configured to control the photographing apparatus such that a motion of the subject appears in an image based on the imaging signal acquired in the first pixel group and the imaging signals acquired two or more times in the second pixel group. For example, the controller 170 may be configured to acquire an image based on the sum of values of the imaging signal acquired in the first pixel group and the imaging signal acquired in the second pixel group. The controller 170 may be configured to control the photographing apparatus such that a motion-corrected image is acquired based on the imaging signal acquired in the second pixel group.

The controller 170 may be configured to acquire intermediate images during the second period based on the imaging signal acquired in the second pixel group. The controller 170 may be configured to acquire a motion vector based on the intermediate images acquired during the second period. The controller 170 may be configured to determine the motion trajectory based on the acquired motion vector. In addition, the controller 170 may be configured to acquire the motion-corrected image based on the acquired motion vector and shake information of the digital photographing apparatus 100*a*. According to the example embodiment, the controller 170 may be configured to adjust a ratio of the number of the pixel rows included in the first pixel group to the number of the pixel rows included in the second pixel group. The controller 170 may be configured to adjust an amount of the imaging signals acquired in the second pixel group.

According to the example embodiment, the controller 170 may be configured to adjust a total exposure time of the first pixel group and a total exposure time of the second pixel group. The controller 170 may be configured to perform a WDR by setting the total exposure time of the first pixel group and the total exposure time of the second pixel group to be different from each other.

The controller 170 may be configured to acquire an image of a portion having a low luminance using the imaging signal acquired in the first pixel group to perform a WDR process. In addition, the controller 170 may be configured to acquire an image of a portion having a high luminance using the imaging signal acquired in the second pixel group to perform a WDR process.

The controller 170 may be configured to adjust the second period during which the imaging signals are acquired in the second pixel group. For example, the controller 170 may be configured to determine the second period based on characteristics of a lens of the digital photographing apparatus 100. For example, the controller 170 may be configured to adjust the second period in proportion to a reciprocal of a focal length of the lens. The controller 170 may, for example, be configured to determine the second period as follows: "second period=1/(focal length*2)".

The second memory 131 may store image signals generated based on the imaging signal acquired during the second period by the image signal processor 120. In addition, the second memory 131 may store motion vectors acquired based on the intermediate images. The second memory 131 may be reset when the capturing of one sheet of an image has been completed.

The memory 130 may store the image output from the image signal processor 120. The memory 130 may store the image to be output to the display 164.

The display 164 may provide visual information and/or auditory information to a user. In order to provide the visual information, the display 164 may include, for example, a liquid crystal display (LCD) panel or an organic light-emitting display (OLED) panel, or the like. In addition, the display 164 may include, for example, a touch screen configured to recognize a touch input.

According to the example embodiment, the display 164 may, for example, display the motion-corrected image.

Before displaying the motion-corrected image, the display 164 may display a live view image based on the intermediate images that are acquired based on the imaging signal acquired in the second pixel group. Since the display 164 is capable of displaying the live view image while one sheet of an image is acquired, a blackout phenomenon may be avoided in the digital photographing apparatus 100a.

Figure 5:
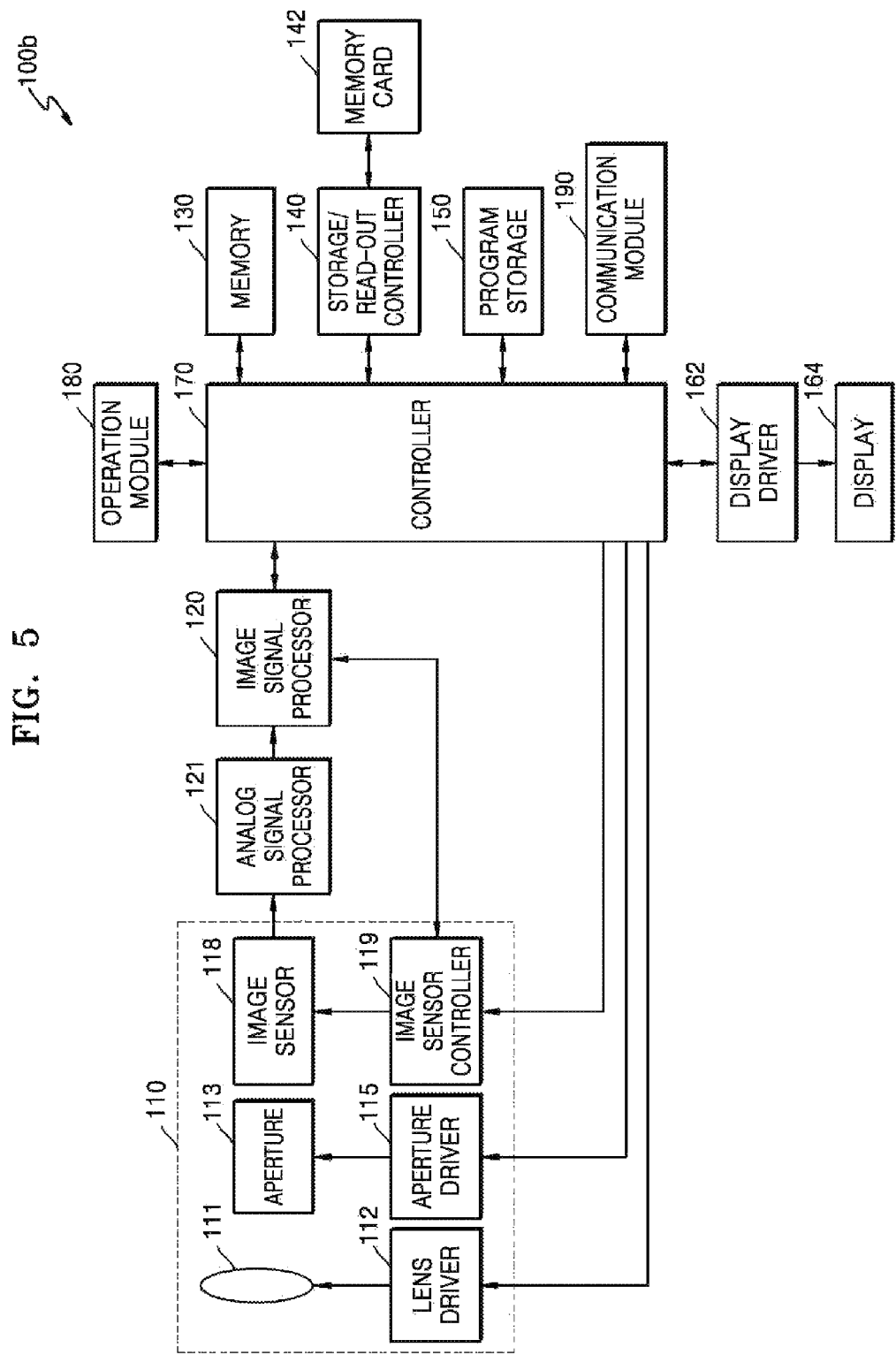
FIG. 5 is a block diagram illustrating an example digital photographing apparatus.

FIG. 5 is a block diagram illustrating an example digital photographing apparatus 100b. The digital photographing apparatus 100b may include, for example, all or part of the elements of the digital photographing apparatus 100 of FIG. 3 and the digital photographing apparatus 100a of FIG. 4.

The digital photographing apparatus 100b according to the example embodiment may include, for example, an imager (e.g., including imaging circuitry) 110, an image signal processor 120, an analog signal processor 121, a memory 130, a storage/read-out controller 140, a memory card 142, a program storage 150, a display driver 162, a display 164, a controller 170, an operation module 180, and a communication module (e.g., including communication circuitry) 190.

The controller 170 may be configured to control an overall operation of the digital photographing apparatus 100b. The controller 170 may be configured to provide control signals to elements of the imager 110, including a lens driver 112, an aperture driver 115, and an image sensor controller 119, to control operations of the elements of the imager 110.

The imager 110 may be configured to convert incident light into an electrical signal and to generate an image corresponding to the electrical signal. The imager 110 may include a lens 111, the lens driver 112, an aperture 113, the aperture driver 115, an image sensor 118, and the image sensor controller 119.

The lens 111 may include a plurality of lens groups, each of which may including, for example, a plurality of lenses. A position of the lens 111 may be adjusted by the lens driver 112. The lens driver 112 adjusts the position of the lens 111 based on a control signal provided by the controller 170.

In addition, the lens driver 112 may control the focal length of the lens 111 by adjusting the position of the lens 111 and may perform autofocusing, zoom adjustment, focus adjustment, and the like.

The aperture driver 115 may adjust a degree of opening of the aperture 113 so as to adjust an amount of light incident on the image sensor 118.

Subject light passing through the lens 111 and the aperture 113 may form a subject image on a light-receiving surface of the image sensor 118. The image sensor 118 may be a CCD image sensor or a CIS, or the like, configured to convert an optical signal into an electrical signal.

The image sensor 118 may generate an imaging signal by imaging the subject light passing through the lens 111 and the aperture 113. The image sensor 118 may include a plurality of photoelectric conversion elements (not illustrated) arranged in a matrix form, and a transmission line (not illustrated) through which an imaging signal is read out by moving charges from the photoelectric conversion elements. Pixels for a focus detection may be disposed at specific positions of the image sensor 118 in a predetermined ratio. The pixels for a focus detection, which are disposed in the image sensor 118, may perform an image plane phase difference AF function.

The image sensor 118 may adjust a sensitivity and a subject light imaging timing under control of the controller 119.

The image sensor controller 119 may be configured to control the image sensor 118 based on a control signal automatically generated by an image signal input in real time or a control signal input manually.

The image sensor controller 119 may be configured to generate a timing signal to allow the image sensor 118 to image the subject light. In addition, the image sensor controller 119 may be configured to perform control such that imaging signals are sequentially acquired at each scan line when charge accumulation has been completed at each scan line of the image sensor 118. The outputs of the pixels for focus detection, which are disposed in the image sensor 118, may be used when the live view image is output. In order to output the live view image, the image sensor controller 119 may be configured to appropriately select a predetermined pixel line of the image sensor 118 and output an imaging signal. In a case where the outputs of the pixels for a focus detection are included in an output signal of the live view image, it is possible to detect a focus of the live view image by using the outputs of the pixels for a focus detection.

The analog signal processor 121 may be configured to perform noise reduction, gain control, waveform shaping, and analog-to-digital conversion, or the like, on an analog signal provided from the image sensor 118.

The image signal processor 120 may be configured to perform a specific function on an image data signal processed by the analog signal processor 121. For example, for image quality enhancement and special effects, the image signal processor 120 may be configured to perform image signal processing, such as noise reduction, gamma correction, color filter array interpolation, color matrix, color correction, and color enhancement, white balancing, luminance smoothing, and color shading, or the like, with respect to input image data. The image signal processor 120 may be configured to compress the input image data into an image file, or may reconstruct the image data from the image file. An image compression format may be reversible or irreversible. For example, a still image may be compressed into a Joint Photographic Experts Group (JPEG) format or a JPEG 2000 format. In the case of recording a video, a plurality of frames may be compressed into a video file in accordance with the Moving Picture Experts Group (MPEG) standard. For example, an image file may be generated in accordance with the exchangeable image file format (Exif) standard.

The image signal processor 120 may be configured to generate a video file from an imaging signal generated by the image sensor 118. The imaging signal may be a signal that is generated by the image sensor 118 and is then processed by the analog signal processor 121. The image signal processor 120 may be configured to generate frames to be included in a video file from an imaging signal, code the frames in accordance with an appropriate standard, for example, MPEG4, H.264/AVC, or windows media video (WMV), compress a video, and generate a video file by using the compressed video. The video file may be generated in various formats, such as mpg, mp4, 3gpp, avi, asf, or mov.

Image data output from the image signal processor 120 may be input to the storage/read-out controller 140 directly or through the memory 130. The storage/read-out controller 140 may store the image data in the memory card 142 automatically or based on a signal input by the user. In addition, the storage/read-out controller 140 may read data related to an image from an image file stored in the memory card 142 and input the data to the display 164 through the memory 130 or another path to display the image on the display 164. The memory card 142 may be detachably or permanently attached to the digital photographing apparatus 100*b*. For example, the memory card 142 may be a flash memory card such as a secure digital (SD) card.

In addition, the image signal processor 120 may be configured to perform sharpness processing, chromatic processing, blurring processing, edge emphasis processing, image interpretation processing, image recognition processing, image effect processing, and the like. The image recognition processing may include, for example, face recognition processing and scene recognition processing. In addition, the image signal processor 120 may be configured to perform image signal processing to display image data on the display 164. For example, the image signal processor 120 may perform luminance level adjustment, color correction, contrast adjustment, contour emphasis adjustment, screen splitting, character image generation, and image synthesis, or the like.

A signal processed by the image signal processor 120 may be input to the controller 170 directly or through the memory 130. The memory 130 may operate as a main memory of the digital photographing apparatus 100*b* and may temporarily store information necessary during the operation of the image signal processor 120 or the controller 170. The program storage 150 stores programs such as an operating system and an application system for driving the digital photographing apparatus 100*b*.

The display 164 may display an operating state of the digital photographing apparatus 100*b* or image information acquired by the digital photographing apparatus 100*b*. The display 164 may provide visual information and/or auditory information. In order to provide the visual information, the display 164 may include an LCD panel or an OLED panel, or the like. In addition, the display 164 may include, for example, a touch screen configured to recognize a touch input.

The display driver 162 may provide a driving signal to the display 164.

The controller 170 may be configured to process an input image signal and to control the components of the digital photographing apparatus 100*b* according to the processed image signal or an external input signal. The controller 170 may, for example, including one or more processors. The processors may, for example, be implemented by an array of plurality of logic gates, or may be implemented by a combination of a general-purpose microprocessor and a memory that stores a program executable in the general-purpose microprocessor. In addition, it will be apparent to one of ordinary skill in the art that the one or more processors may be implemented by other types of hardware.

The controller 170 may be configured to generate control signals for controlling autofocusing, zoom adjustment, focus adjustment, automatic exposure compensation, and the like by executing the program stored in the program storage 150 or by using a separate module, provide the control signals to the aperture driver 115, the lens driver 112, and the image sensor controller 119, and control the overall operations of the elements of the digital photographing apparatus 100*b*, such as a shutter and a stroboscope.

In addition, the controller 170 may be connected to an external monitor and be configured to perform image signal processing so that an image signal input from the image signal processor 120 is displayed on the external monitor. The controller 170 may be configured to transmit the processed image data to the external monitor so that an image corresponding to the processed image data is displayed on the external monitor.

Figure 6:
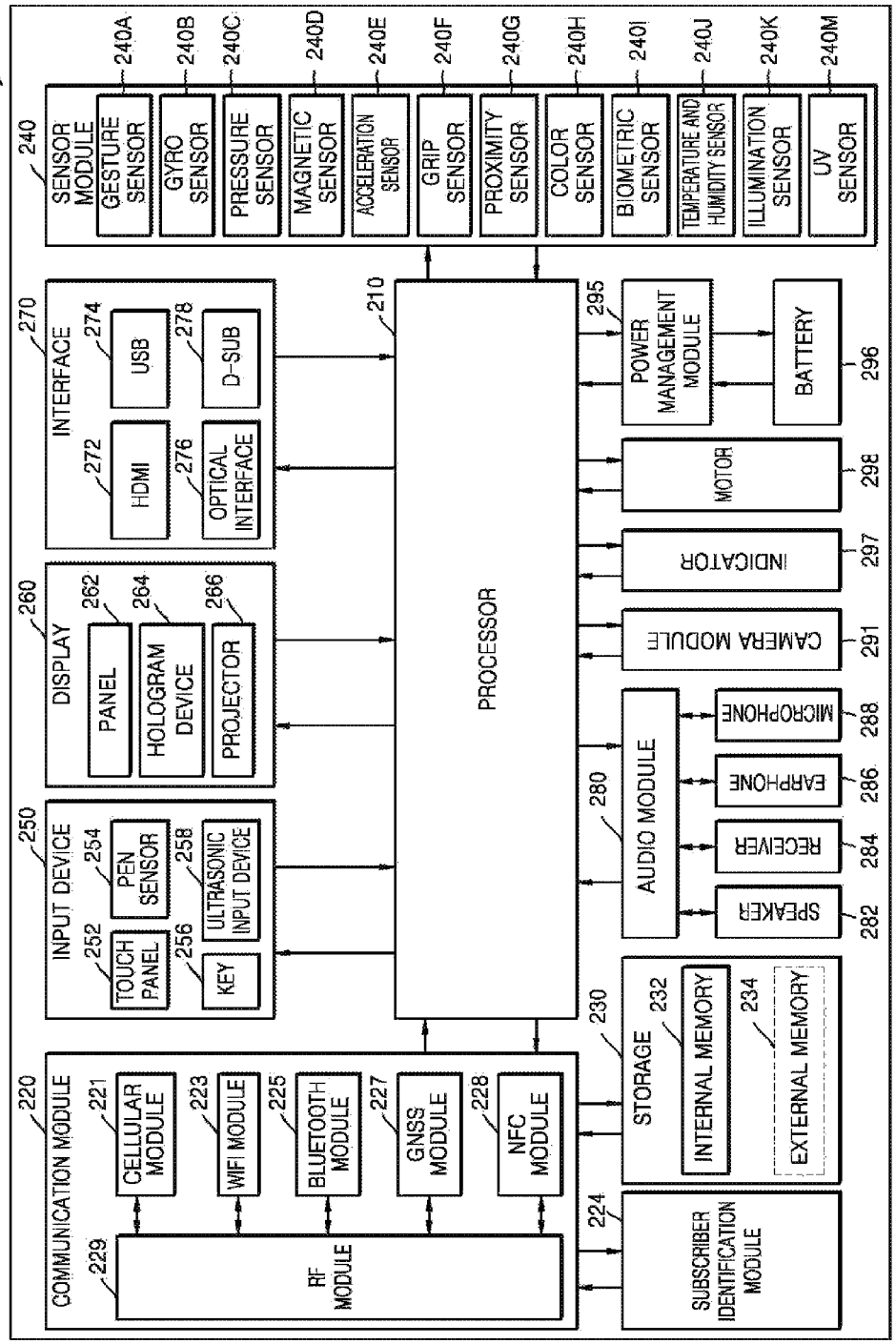
FIG. 6 is a block diagram illustrating an example digital photographing apparatus.

FIG. 6 is a block diagram illustrating an example digital photographing apparatus 100*c*. The digital photographing apparatus 100*c* may include all or part of the elements of the digital photographing apparatus 100 of FIG. 3 and the digital photographing apparatus 100*a* of FIG. 4.

The digital photographing apparatus 100*c* according to the example embodiment may include at least one processor (e.g., application processor) 210, a communication module (e.g., including communication circuitry) 220, a subscriber identification module 224, a storage 230, a sensor module (e.g., including sensors) 240, an input device 250, a display 260, an interface 270, an audio module 280, a camera module 291, a power management module 295, a battery 296, an indicator 297, and a motor 298.

The processor 210 may be configured to execute an operating system or an application program to control a plurality of hardware or software components connected thereto, and may perform a variety of data processing and arithmetic operations. The processor 210 may be implemented by a system on chip (SoC). According to the example embodiment, the processor 210 may, for example, further include a graphic processor (GPU) and/or an image signal processor. The processor 210 may include at least some (e.g., cellular module 221) of the elements illustrated in FIG. 5. The processor 210 may load a command or data received from at least one of other elements (e.g., non-volatile memory), process the loaded command or data, and store various data in the non-volatile memory.

The communication module 220 may include the cellular module 221, a wireless fidelity (Wi-Fi) module 223, a Bluetooth module 225, a global navigation satellite system (GNSS) module 227 (e.g., a GPS module, a Glonass module, a Beidou module, or a Galileo module), a near-field communication (NFC) module 228, and a radio frequency (RF) module 229.

The storage 230 may include an internal memory 232 and/or an external memory 234. The internal memory 232 may include at least one selected from among a volatile memory (e.g., dynamic random access memory (DRAM), static RAM(SRAM), synchronous DRAM (SDRAM), etc.), a non-volatile memory (e.g., one time programmable read-only memory (OTPROM), programmable ROM (PROM), erasable and programmable ROM (EPROM, etc.), electrically erasable and programmable ROM (EEPROM), mask ROM, flash ROM, flash memory (e.g., NAND flash, NOR flash, etc.), hard disk drive (HDD), and solid state drive (SSD).

The external memory 234 may include a flash drive, for example, compact flash (CF), secure digital (SD), micro secure digital (micro-SD), mini secure digital (mini-SD), extreme digital (xD), multi-media card (MMC), or memory stick. The external memory 234 may be functionally and/or physically connected to the digital photographing apparatus 100c via various interfaces.

The sensor module 240 may measure physical quantities or detect an operating state of the digital photographing apparatus 100c and convert measured or detected information into an electrical signal. The sensor module 240 may include at least one selected from among a gesture sensor 240A, a gyro sensor 240B, a pressure sensor 240C, a magnetic sensor 240D, an acceleration sensor 240E, a grip sensor 240F, a proximity sensor 240G, a color sensor 240H (e.g., a red, green and blue (RGB) sensor), a biometric sensor 240I, a temperature/humidity sensor 240J, an illumination sensor 240K, and an ultraviolet (UV) sensor 240M. The sensor module 240 may further include a control circuit configured to control at least one sensor included therein. In some examples, the digital photographing apparatus 100c may further include a processor configured to control the sensor module 240, as a part of the processor 210 or separately from the processor 210, so that the sensor module 240 is controlled when the processor 210 is in a sleep state.

The input device 250 may include a touch panel 252, a (digital) pen sensor 254, a key 256, and/or an ultrasonic input device 258. The touch panel 252 may, for example, be at least one selected from among a capacitive touch panel, a resistive touch panel, an infrared touch panel, and an ultraviolet touch panel. In addition, the touch panel 252 may further include a control circuit. The touch panel 252 may further include a tactile layer configured to provide a tactile response to a user.

The (digital) pen sensor 254 may, for example, be a part of the touch panel 252 or may include a separate recognition sheet. The key 256 may include, for example, a physical button, an optical key, or a keypad. The ultrasonic input device 258 may detect an ultrasonic wave generated by an input tool through a microphone 288 and check data corresponding to the detected ultrasonic wave.

The display 260 may include, for example, a panel 262, a hologram device 264, and/or a projector 266. The panel 262 may be implemented to be flexible, transparent, or wearable. The panel 262 and the touch panel 252 may be configured as one module.

The interface 270 may include, for example, high-definition multimedia interface (HDMI) 272, universal serial bus (USB) 274, optical interface 276, or D-subminiature (D-sub) 278.

The audio module 280 may perform bidirectional conversion between a sound and an electrical signal. The audio module 280 may be configured to process sound information input or output through a speaker 282, a receiver 284, an earphone 286, and/or the microphone 288.

The camera module 291 may be configured to capture a still image and a moving image. According to an example embodiment, the camera module 291 may include one or more image sensors (e.g., a front sensor or a rear sensor), a lens, an image signal processor (ISP), or a flash (e.g., an LED or a xenon lamp, etc.).

The power management module 295 may be configured to manage the power of the digital photographing apparatus 100c. According to an example embodiment, the power management module 295 may include a power management integrated circuit (PMIC), a charger integrated circuit (IC), or a battery or fuel gauge. The PMIC may use a wired and/or wireless charging method. The battery gauge may be configured to measure a residual capacity, a charged voltage, a current, or a temperature of the battery 296.

The indicator 297 may be configured to display specific states of all or part (e.g., the processor 210) of the elements of the digital photographing apparatus 100c, for example, booting states, message states, or charging states. The motor 298 may be configured to convert an electrical signal into a mechanical vibration and generate a vibration or haptic effect.

The elements described in the disclosure may be configured by one or more components, and the names of the elements may be changed according to the type of the digital photographing apparatus. According to various example embodiments, the digital photographing apparatus may be configured to include at least one of the elements described in the disclosure, some elements may be omitted, or additional components may be further included. Some of the elements of the digital photographing apparatus according to various example embodiments may be combined into one entity and perform the same functions as the previous elements prior to the combination.

Figure 7:
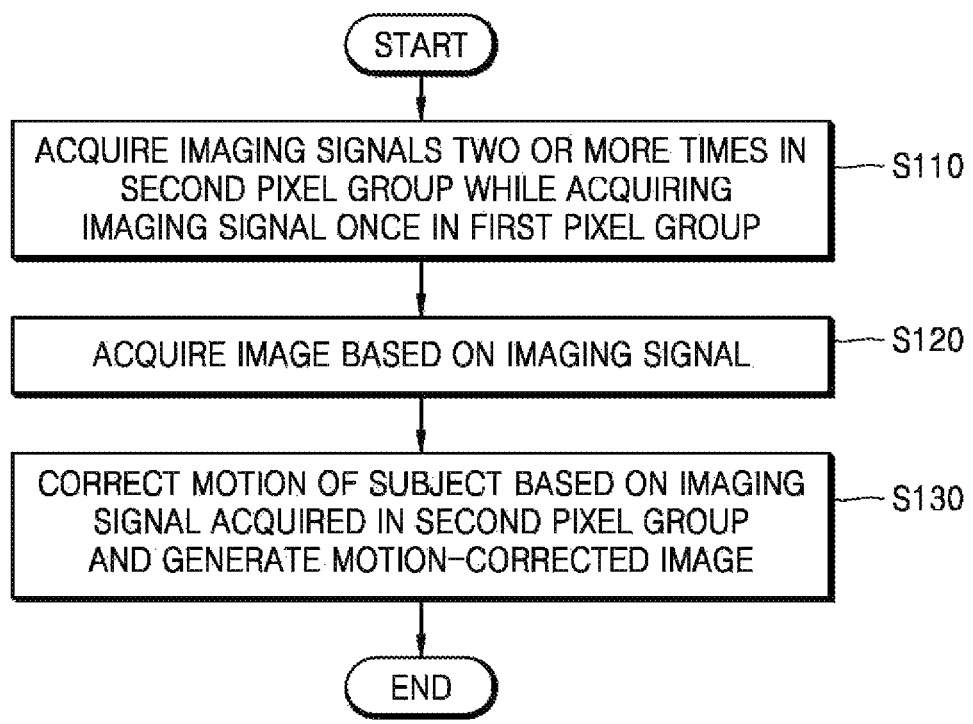
FIG. 7 is a flowchart illustrating an example method of operating a digital photographing apparatus.

FIG. 7 is a flowchart illustrating an example method of operating the digital photographing apparatus 100.

Hereinafter, the flowchart of FIG. 7 will be described with reference to FIGS. 8A to 11.

In operation S110, the digital photographing apparatus 100 may acquire imaging signals two or more times in the second pixel group while acquiring an imaging signal once in the first pixel group.

According to an example embodiment, the digital photographing apparatus 100 may acquire imaging signals in the second pixel group during a second period while acquiring an imaging signal in the first pixel group during a first period.

Figure 8A:
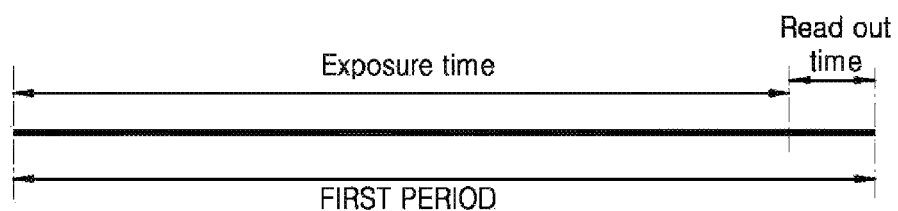
FIGS. 8A to 8C are diagrams illustrating an example process by which the digital photographing apparatus acquires an imaging signal in first lines.
Figure 8B:
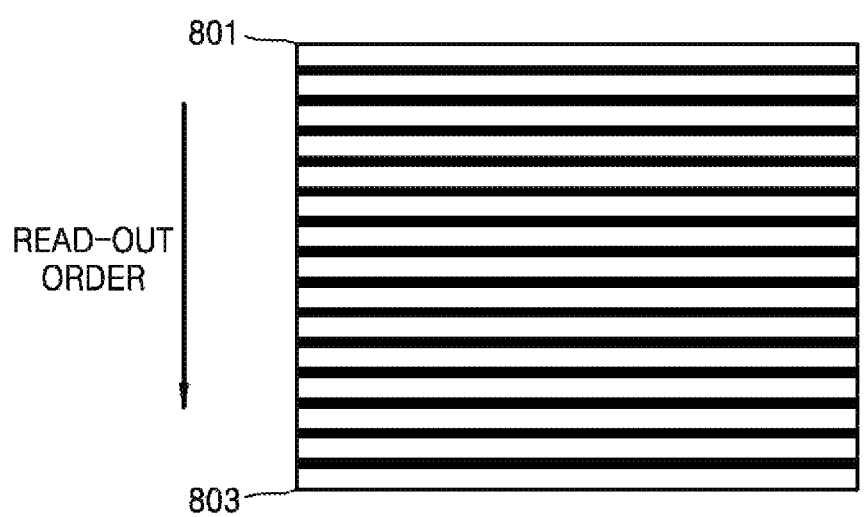
Figure 8C:
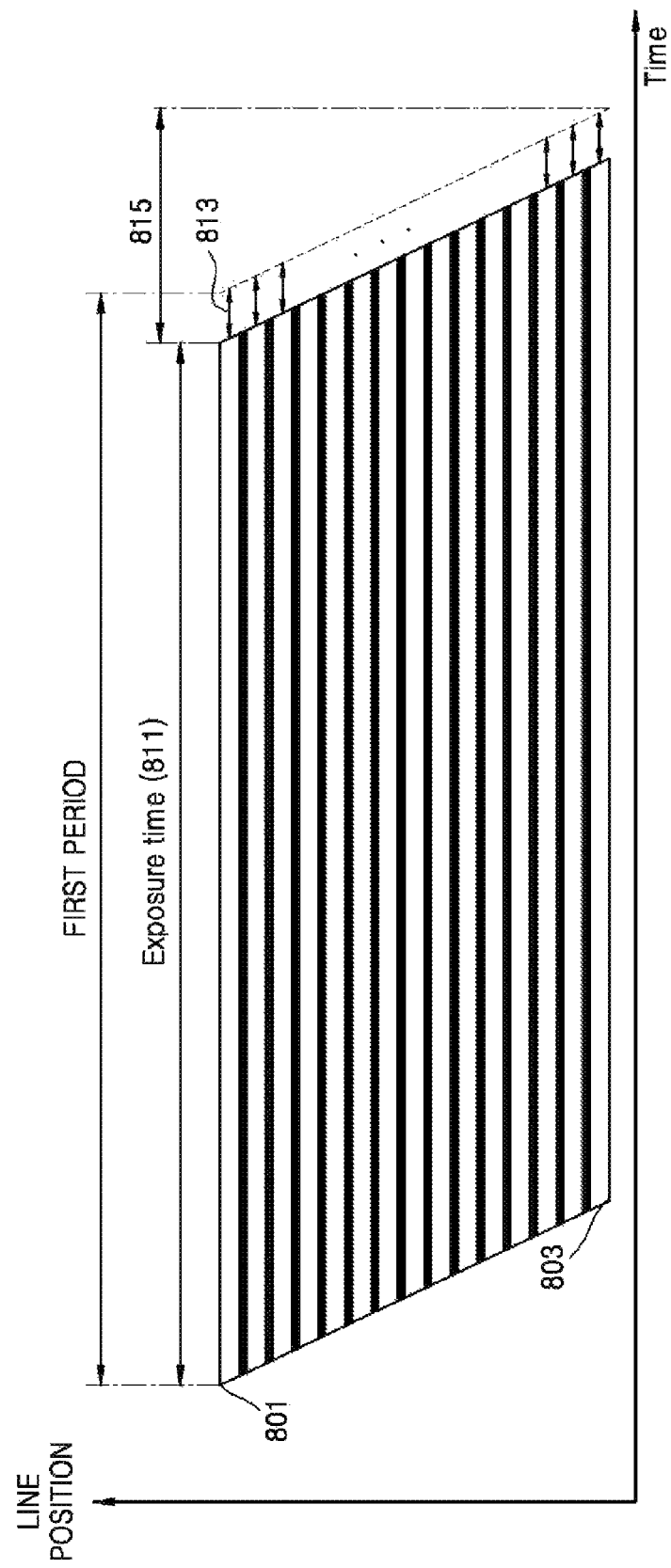

FIGS. 8A to 8C are diagrams illustrating an example process by which the digital photographing apparatus 100 acquires imaging signals in the first pixel group.

The first pixel group may include, for example, first lines with at least one pixel row including a plurality of pixels. Hereinafter, for convenience of description, a case where the first pixel group includes first lines will be described.

Referring to FIG. 8A, the digital photographing apparatus 100 may acquire the imaging signal once in the first lines during the first period including an exposure time and a read-out time. The digital photographing apparatus 100 may accumulate charges by photoelectrically converting the subject light during the exposure time in the image sensor. The digital photographing apparatus 100 may acquire a value of an imaging signal corresponding to the charges accumulated during the read-out time. When capturing one sheet of an image, the digital photographing apparatus 100 may acquire the imaging signal once by performing the exposure process and the read-out process once in the first line.

Referring to FIG. 8B, the digital photographing apparatus 100 may sequentially read out the imaging signals from the first "first line" 801 to the last "first line" 803.

When reading out the imaging signal in the first "first line" 801, the digital photographing apparatus 100 may sequentially acquire the imaging signals in the pixel rows included in the first "first line" 801. Similarly, the digital photographing apparatus 100 may acquire the imaging signals in the pixel rows included in the other first lines.

FIG. 8C is a diagram illustrating an example process by which the digital photographing apparatus 100 acquires an imaging signal once in the first lines.

For example, FIG. 8C illustrates positions of the first lines of the image sensor and time when the digital photographing apparatus 100 acquires the imaging signals in the first lines.

Referring to FIG. 8C, the digital photographing apparatus 100 may acquire the imaging signal in the first "first line" 801 during the first period including an exposure time 811 and a read-out time 813. Similarly, the digital photographing apparatus 100 may acquire the imaging signals in the other first lines during the first period. The digital photographing apparatus 100 may perform the read-out process for each pixel row included in the image sensor and may sequentially read out the imaging signals from the first "first line" 801 to the last "first line" 803. When reading out the imaging signals in the image sensor, the digital photographing apparatus 100 may perform the read-out process in the order of arrangement of the pixel rows and may differently adjust an exposure start time for each pixel row.

Reference numeral 815 of FIG. 8C represents the time taken for the digital photographing apparatus 100 to read out the imaging signals from the first "first line" 801 to the last "first line" 803. The time 815 taken for the digital photographing apparatus 100 to read out the imaging signals in the first lines may, for example, be less than about 0.1 second. The time 815 may change based on the number of pixels included in the first lines and the performance of the image sensor in the digital photographing apparatus 100.

Figure 9A:
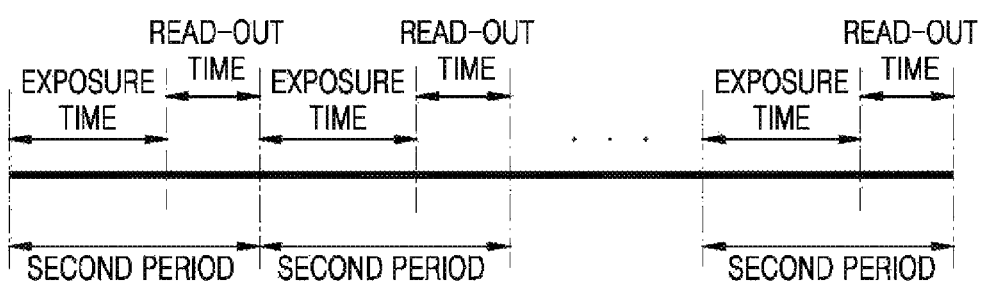
Figure 9B:
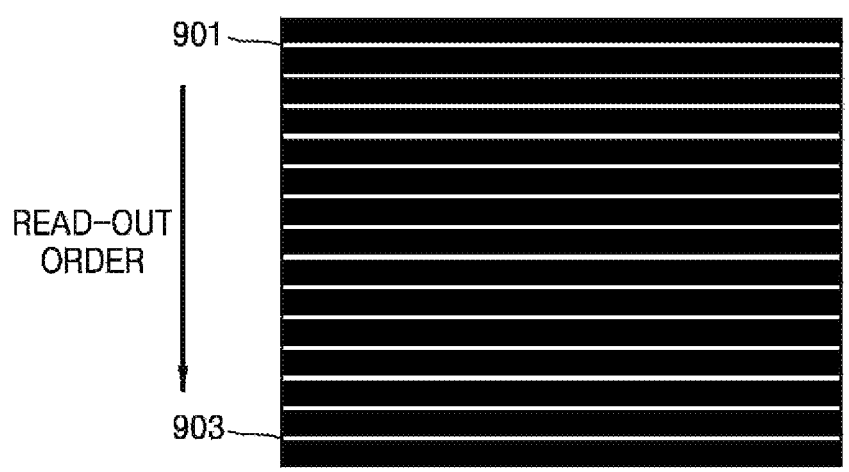

FIGS. 9A to 9C are diagrams illustrating an example process by which the digital photographing apparatus 100 acquires imaging signals in the second pixel group.

The second pixel group may include, for example, second lines with at least one pixel row including a plurality of pixels. Hereinafter, for convenience of description, a case where the second pixel group includes second lines will be described.

Referring to FIG. 9A, the digital photographing apparatus 100 may acquire imaging signals in second lines during a second period including an exposure time and a read-out time.

Referring to FIG. 9A, the digital photographing apparatus 100 may accumulate charges by photoelectrically converting the subject light during the exposure time of the second period in the image sensor. The exposure time of the second period illustrated in FIGS. 9A to 9C may be shorter than the exposure time of the first period. The digital photographing apparatus 100 may acquire a value of an imaging signal corresponding to the charges accumulated during the read-out time. When capturing one sheet of an image, the digital photographing apparatus 100 may acquire the imaging signals two or more times by repeating the exposure process and the read-out process in the second lines.

Referring to FIG. 9B, the digital photographing apparatus 100 may sequentially read out the imaging signals from the first "second line" 901 to the last "second line" 903.

When reading out the imaging signal in the first "second line" 901, the digital photographing apparatus 100 may acquire the imaging signals in at least one pixel row included in the first "second line" 901. Similarly, the digital photographing apparatus 100 may acquire the imaging signals in the pixel rows included in the other second lines. The first "second line" 901 may, for example, be one pixel row or may include a plurality of pixel rows.

FIG. 9C is a diagram illustrating an example process by which the digital photographing apparatus 100 acquires imaging signals two or more times in the second lines of the image sensor.

For example, FIG. 9C illustrates positions of the second lines of the image sensor and time when the digital photographing apparatus 100 acquires the imaging signals in the second lines.

Referring to FIG. 9C, the digital photographing apparatus 100 may acquire the imaging signal in the first "second line" 901 during a second period including an exposure time and a read-out time 913. Similarly, the digital photographing apparatus 100 may acquire the imaging signals in the other second lines during the second period. The digital photographing apparatus 100 may perform the read-out process for each pixel row included in the image sensor and may sequentially read out the imaging signals from the first "second line" 901 to the last "second line" 903.

Referring to FIG. 9C, the digital photographing apparatus 100 may store, in a first memory, the imaging signals acquired from the first "second line" 901 to the last "second line" 903.

After the digital photographing apparatus 100 acquires the imaging signals in the first "second line" 901 during the first "second period", the exposure process may be started in the first "second line" 901 during a second "second period". Similarly, the digital photographing apparatus 100 may acquire the imaging signals in the other second lines during the second "second period".

If such processes are repeated, when capturing one sheet of an image, the digital photographing apparatus 100 may acquire the imaging signals two or more times by repeating the exposure process and the read-out process in the second lines.

In operation S120, the digital photographing apparatus 100 may acquire an image in which a motion of a subject appears, based on the imaging signal acquired by the image sensor.

For example, the digital photographing apparatus 100 may acquire an image based on the sum of values of the imaging signals acquired in the first lines of the image sensor and the imaging signals acquired in the second lines of the image sensor.

Figure 10:
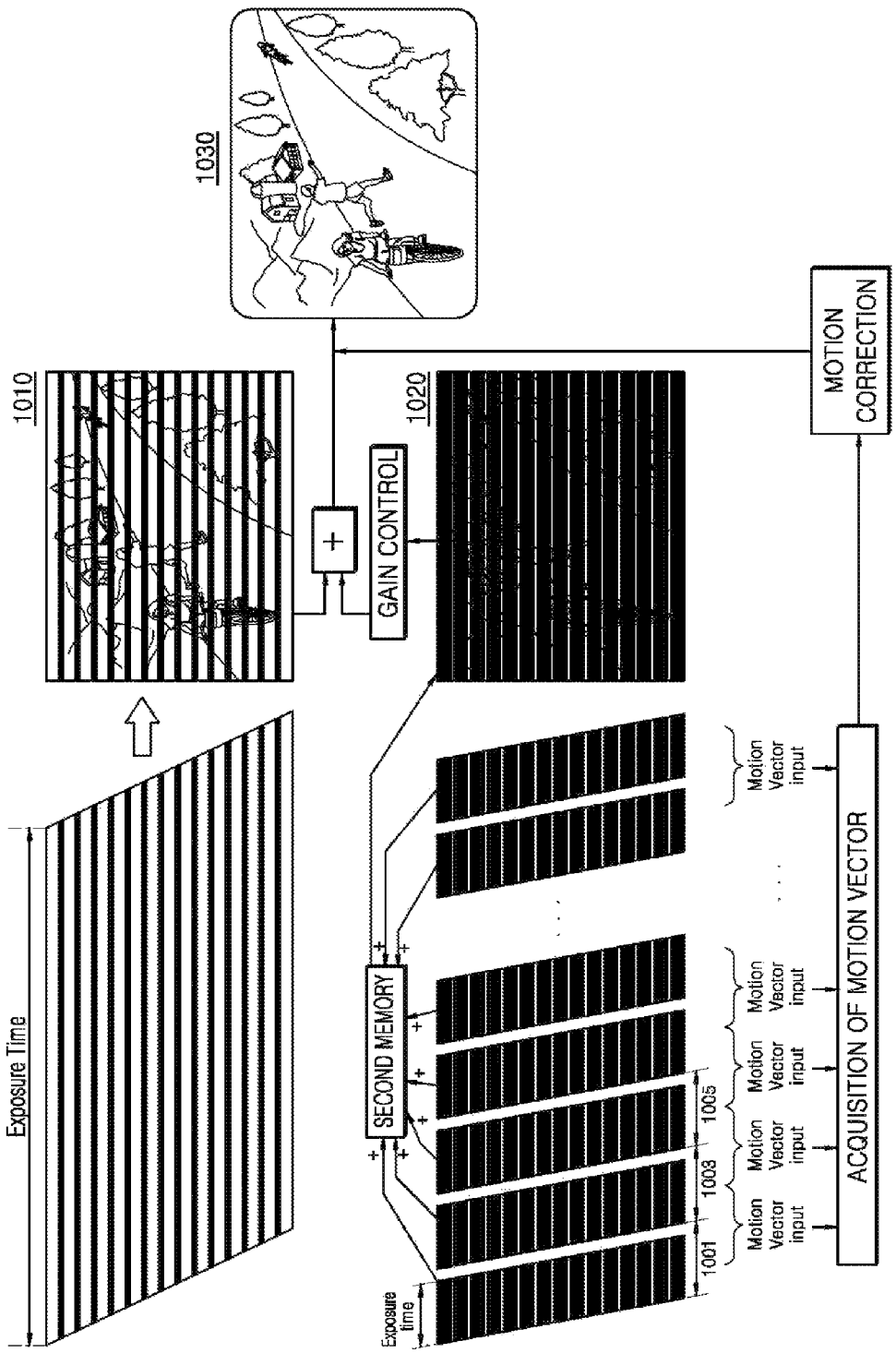
FIG. 10 is a diagram illustrating an example process by which the digital photographing apparatus generates a motion-corrected image.

Referring to FIG. 10, when an image is generated by only the imaging signals acquired in the first lines, the digital photographing apparatus 100 may acquire a first image 1010. When an image is generated by only the imaging signals acquired in the second lines, the digital photographing apparatus 100 may acquire a second image 1020. For example, the digital photographing apparatus 100 may acquire the second image 1020 by storing all the imaging signals acquired during second periods 1001, 1003, 1005, . . . in the first memory and summing the imaging signals.

When the total exposure time in the first line is longer than the total exposure time in the second line, a brightness of the subject in the first image 1010 is different from a brightness of the subject in the second image 1020. After a gain of the second image 1020 is corrected based on the first image 1010, the first image 1010 and the second image 1020 may be summed.

Referring to FIG. 10, the digital photographing apparatus 100 may acquire an image in which the motion of the subject appears by summing the first image 1010 and the second image 1020.

In operation S130, the digital photographing apparatus 100 may generate a motion-corrected image based on the imaging signal acquired in the second pixel group.

Referring to FIG. 10, the digital photographing apparatus 100 may acquire a result image 1030 by correcting the motion of the acquired image based on the first image 1010 and the second image 1020.

According to an example embodiment, the digital photographing apparatus 100 may acquire intermediate images during the second period based on the imaging signals acquired in the second lines. The digital photographing apparatus 100 may acquire a motion vector based on the acquired intermediate images.

For example, referring to FIG. 10, the digital photographing apparatus 100 may acquire a motion vector from the intermediate image acquired during the second period 1001 and the intermediate image acquired during the second period 1003. In addition, the digital photographing apparatus 100 may acquire a motion vector from the intermediate image acquired during the second period 1003 and the intermediate image acquired during the second period 1005. Similarly, the digital photographing apparatus 100 may acquire motion vectors from the intermediate images acquired during other adjacent second periods.

The digital photographing apparatus 100 may acquire a result image 1030 by correcting the motion in the image in which the motion of the subject appears, based on the acquired motion vectors.

The digital photographing apparatus 100 may acquire a trajectory of the motion during the first period from the motion vectors acquired based on the intermediate images.

Figure 11:
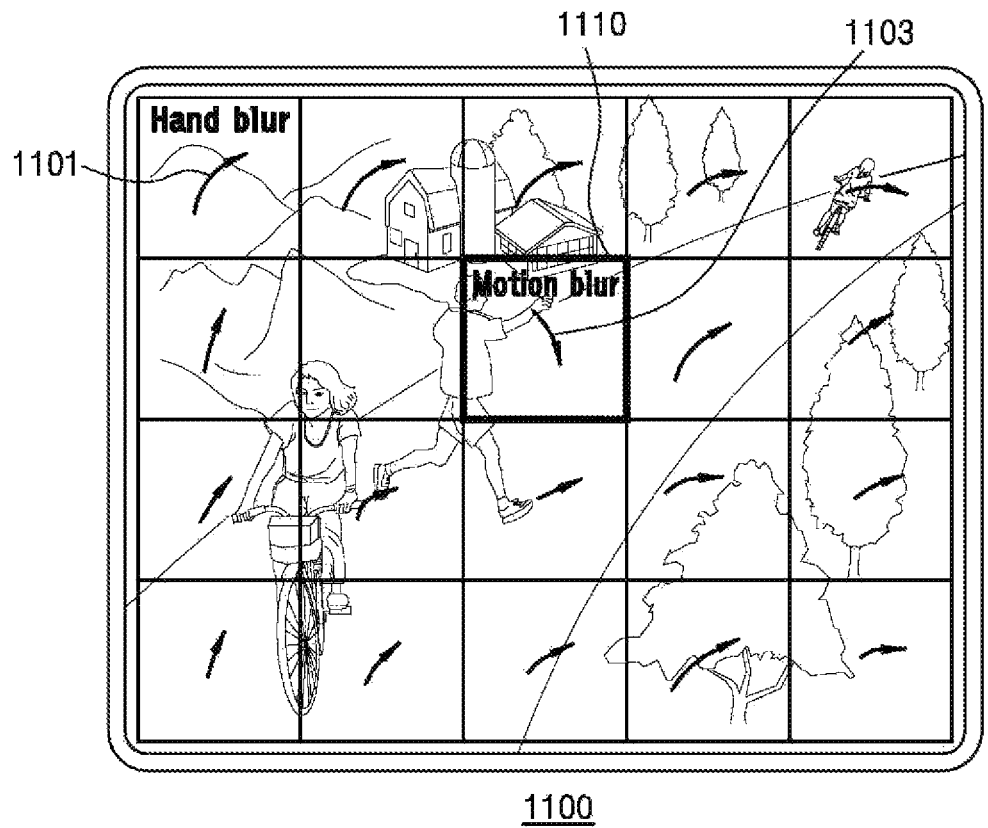
FIG. 11 is a diagram illustrating an example image including a motion trajectory acquired by the digital photographing apparatus.

Referring to FIG. 11, the digital photographing apparatus 100 may determine characteristics of the motion from trajectories 1101 and 1103 of the motion during the first period.

For example, an average of the trajectory 1103 of the motion in a specific region 1110 of the image 1100 before the motion correction may be different from an average of directions of the trajectories of the motion in other regions.

In this case, the digital photographing apparatus 100 may determine that the trajectory 1101 of the motion during the first period is a global motion caused by shaking of the user of the digital photographing apparatus 100. In addition, the digital photographing apparatus 100 may determine that the trajectory 1103 of the motion during the first period is a local motion caused by the motion of the subject.

The digital photographing apparatus 100 may perform a global motion correction and a local motion correction at the same time.

Figure 12:
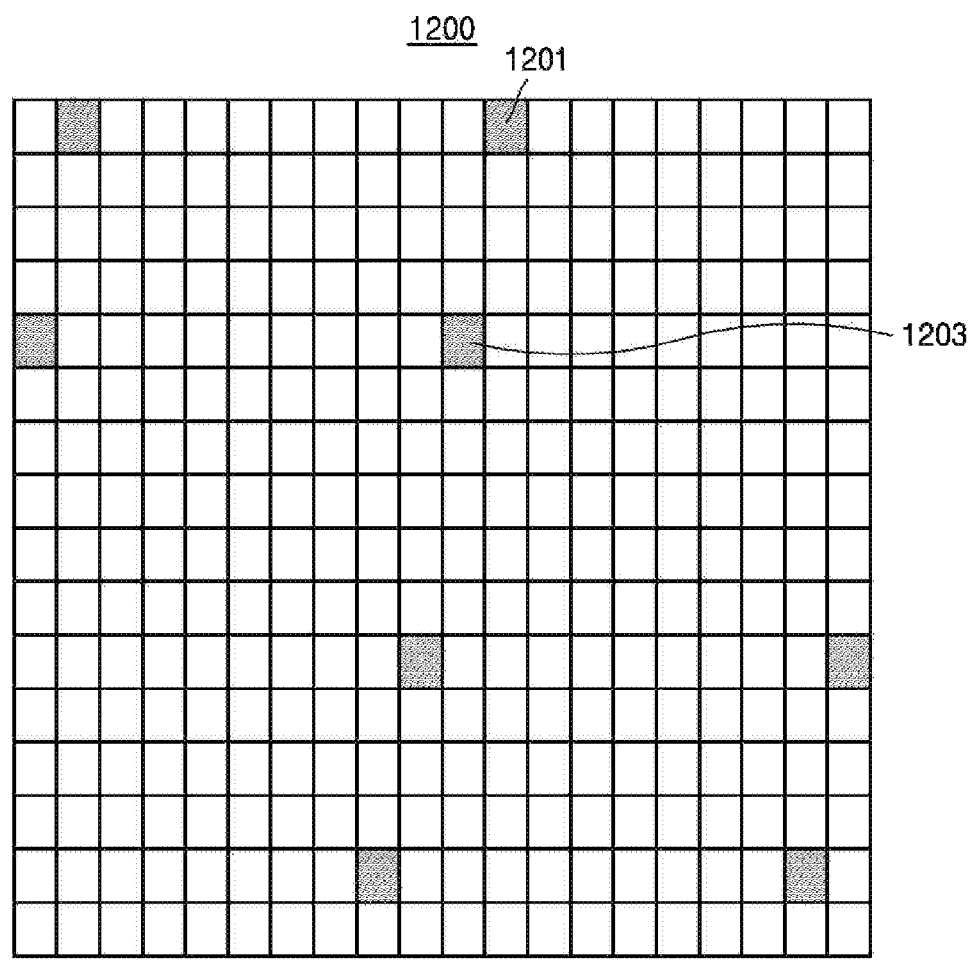
FIG. 12 is a diagram illustrating an example image sensor including pixels for a phase difference detection.

FIG. 12 is a diagram illustrating an example image sensor 1200 including pixels 1201 and 1203 for phase difference detection.

Referring to FIG. 12, the image sensor 1200 according to the example embodiment may include, for example, a plurality of pixels arranged in a matrix form. The image sensor 1200 according to the example embodiment may include, for example, pixels 1201 and 1203 for a phase difference detection over an entire region. The other pixels, except for the pixels 1201 and 1203 of FIG. 12 for phase difference detection, may, for example, be general imaging elements.

The digital photographing apparatus 100 may acquire a phase difference based on signals acquired by the pixels 1201 and 1203 for phase difference detection. For example, the digital photographing apparatus 100 may acquire a phase difference through a correlation operation of the signals acquired by pixels 1201 and 1203 for phase difference detection.

In addition, the digital photographing apparatus 100 may acquire the imaging signals from general imaging elements instead of the pixels for phase difference detection.

The digital photographing apparatus 100 according to the example embodiment may acquire information about a focus of the imaging signal acquired by the image sensor 1200, based on the acquired phase difference. The digital photographing apparatus 100 may perform auto focus (AF) based on the information about the focus of the imaging signal.

The 20×16 image sensor 1200 is illustrated in FIG. 12, however, example embodiments are not limited thereto. In addition, the number and the arrangement of the pixels for phase difference detection in the image sensor 1200 may be changed according to various examples.

The digital photographing apparatus 100 may, for example, acquire motion vectors having a direction perpendicular to the light-receiving surface of the image sensor 1200 based on the motion vectors having a direction parallel to the light-receiving surface of the image sensor 1200, which are acquired from the general imaging elements, and phase AF information acquired from the pixels for phase difference detection. Accordingly, the digital photographing apparatus 100 may acquire a clearer result signal.

Figure 13:
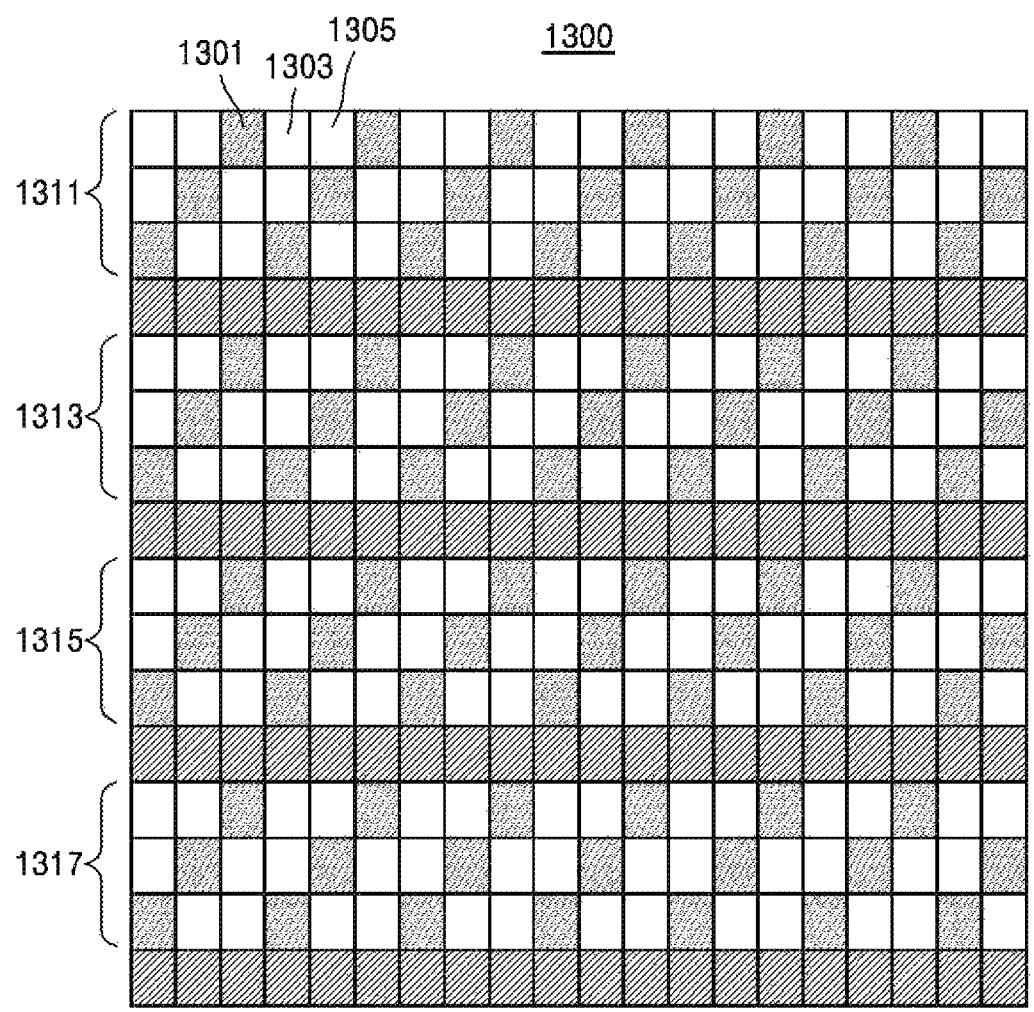
FIG. 13 is a diagram illustrating an example image sensor that acquires an imaging signal in a first line using an example skip read scheme.

FIG. 13 is a diagram illustrating an example image sensor 1300 that acquires an imaging signal in a first pixel group using an example skip read scheme.

The image sensor 1300 according to the example embodiment may acquire an imaging signal from some of pixels included in the image sensor 1300.

Referring to FIG. 13, the image sensor 1300 according to the example embodiment may include a plurality of pixels arranged in a matrix form. The image sensor 1300 may include first pixel groups 1311, 1313, 1315, and 1317.

Referring to FIG. 13, when the image sensor 1300 acquires the imaging signal from one pixel 1301 while acquiring the imaging signals in the first pixel groups 1311, 1313, 1315, and 1317, two next pixels 1303 and 1305 may be skipped. The scheme of acquiring the imaging signals in the image sensor 1300 in the above manner may be referred to as a "read 1 skip 2" scheme.

Each of the first pixel groups 1311, 1313, 1315, and 1317 is illustrated in FIG. 13 as including three pixel rows, but example embodiments are not limited thereto. In addition, the 20×16 image sensor 200a is illustrated in FIG. 2A, the example embodiments are not limited thereto. The skipped pixels and the read-out pixels in the image sensor 1300 may be changed based on various example embodiments.

When the image signals are acquired by the method of skipping some pixels of the image sensor 1300 and reading out some pixels, the digital photographing apparatus 100 may acquire the imaging signals at faster speed, as compared with the case of acquiring the imaging signals from all the pixels of the image sensor 1300.

According to various example embodiments, it is possible to reduce power consumption for acquiring a motion-corrected image and acquire an image with reduced and/or without any shake effects even in nightscape and low luminance environments.

In addition, according to various example embodiments, it is possible to acquire a more accurately motion-corrected image.

The example embodiments set forth herein may be embodied as program instructions that can be executed by various computing circuitry and recorded on a non-transitory computer-readable recording medium. Examples of the non-transitory computer-readable recording medium may include program instructions, data files, and data structures solely or in combination. The program instructions recorded on the non-transitory computer-readable recording medium may be specifically designed and configured for the disclosure, or may be well known to and usable by one of ordinary skill in the field of computer software. Examples of the non-transitory computer-readable recording medium may include magnetic media (e.g., a hard disk, a floppy disk, a magnetic tape, etc.), optical media (e.g., a compact disc-read-only memory (CD-ROM), a digital versatile disk (DVD), etc.), magneto-optical media (e.g., a floptical disk, etc.), and a hardware device specially configured to store and execute program instructions (e.g., a ROM, a random access memory (RAM), a flash memory, etc.). Examples of the program instructions may include not only machine language codes prepared by a compiler but also high-level codes executable by a computer by using an interpreter.

It should be understood that example embodiments described herein should be considered in a descriptive sense only and not for purposes of limitation. Descriptions of features or aspects within each example embodiment should typically be considered as available for other similar features or aspects in other example embodiments.

While one or more example embodiments have been described with reference to the figures, it will be understood by those of ordinary skill in the art that various changes in form and details may be made therein without departing from the spirit and scope as defined by the following claims.

What is claimed is:

1. A digital photographing apparatus comprising:
   an image sensor including a first pixel group and a second pixel group, each pixel group including a plurality of pixels for generating imaging signals by photoelectrically converting incident light, the image sensor being configured to acquire imaging signals two or more times in the second pixel group during a time in which imaging signals are acquired once in the first pixel group; and
   a processor configured to generate a first image containing motion of a subject based on a sum of values of the imaging signals acquired in the first and second pixel groups, and to generate a second image by correcting for the motion of the subject in the first image based on motion vectors associated with the imaging signals acquired in the second pixel group.

2. The digital photographing apparatus of claim 1, wherein the number of pixels included in the first pixel group is greater than the number of pixels included in the second pixel group.

3. The digital photographing apparatus of claim 1, wherein the image sensor is configured to acquire the imaging signals in the first pixel group during a first period and to acquire the imaging signals in the second pixel group during a second period, wherein the first period is a multiple of the second period.

4. The digital photographing apparatus of claim 3, wherein the processor is configured to generate intermediate images during the second period based on the imaging signals acquired in the second pixel group and to generate the motion vectors based on the generated intermediate images.

5. The digital photographing apparatus of claim 4, wherein the processor is further configured to generate the second image based on shake information for the digital photographing apparatus.

6. The digital photographing apparatus of claim 1, further comprising a display configured to display the second image.

7. The digital photographing apparatus of claim 6, wherein the display is configured to display a live view image based on intermediate images that are generated based on the imaging signals acquired in the second pixel group before displaying the second image.

8. The digital photographing apparatus of claim 1, wherein the processor is configured to perform a wide dynamic range (WDR) function by adjusting at least one of: the first period, the second period, and an exposure time during the second period.

9. The digital photographing apparatus of claim 1, wherein the image sensor includes pixels capable of acquiring distance information, and
   the processor is configured to acquire distance information and autofocus (AF) information using a phase difference signal acquired by the pixels capable of acquiring distance information.

10. A digital photographing method using an image sensor including a first pixel group and a second pixel group, each pixel group including a plurality of pixels for generating an imaging signal by photoelectrically converting incident light, the digital photographing method comprising:
    acquiring imaging signals two or more times in the second pixel group during a time in which imaging signals are acquired once in the first pixel group;
    generating a first image containing motion of a subject, based on a sum of values of the imaging signals acquired in the first and second pixel groups; and
    generating a second image by correcting for the motion of the subject in the first image based on motion vectors associated with the imaging signals acquired in the second pixel group.

11. The digital photographing method of claim 10, wherein the number of pixels included in the first pixel group is greater than the number of pixels included in the second pixel group.

12. The digital photographing method of claim 10, wherein the acquiring of the imaging signal comprises:
    acquiring the imaging signals in the first pixel group during a first period; and
    acquiring the imaging signals in the second pixel group during a second period,
    wherein the first period is a multiple of the second period.

13. The digital photographing method of claim 12, wherein the generating of the second image comprises:
    generating intermediate images during the second period based on the imaging signals acquired in the second pixel group; and
    generating the motion vectors based on the generated intermediate images.

14. The digital photographing method of claim 13, wherein the generating of the second image is further based on shake information for a digital photographing apparatus.

15. The digital photographing method of claim 10, further comprising displaying the second image.

16. The digital photographing method of claim 15, further comprising displaying a live view image based on intermediate images that are generated based on the imaging signals acquired in the second pixel group before displaying the second image.

17. The digital photographing method of claim 10, further comprising performing a wide dynamic range (WDR) function by adjusting at least one of: the first period, the second period, and an exposure time during the second period.

18. The digital photographing method of claim 10, wherein a motion vector having a direction perpendicular to a light-receiving surface and autofocus (AF) information are generated using distance information signal acquired by pixels of the image sensor capable of acquiring distance information.

19. A non-transitory computer-readable recording medium having recorded thereon a program which, when executed, controls a digital photographing apparatus comprising an image sensor including first and second pixel groups to perform at least:

acquiring imaging signals two or more times in the second pixel group during a time in which an imaging signal is acquired once in the first pixel group;

generating a first image containing motion of a subject, based on a sum of values of the imaging signals acquired in the first and second pixel groups; and generating a second image by correcting for the motion of the subject in the first image based on motion vectors associated with the imaging signals acquired in the second pixel group.

* * * * *